March 2, 1937. J. R. PEIRCE 2,072,429
ACCOUNTING MACHINE
Filed Aug. 20, 1931  19 Sheets-Sheet 5

INVENTOR
J. R. Peirce
BY ATTORNEY
W. M. Wilson

March 2, 1937.    J. R. PEIRCE    2,072,429
ACCOUNTING MACHINE
Filed Aug. 20, 1931    19 Sheets-Sheet 8

FIG. 8.

INVENTOR
J. R. Peirce
BY ATTORNEY
W. M. Wilson

March 2, 1937.  J. R. PEIRCE  2,072,429
ACCOUNTING MACHINE
Filed Aug. 20, 1931   19 Sheets-Sheet 11
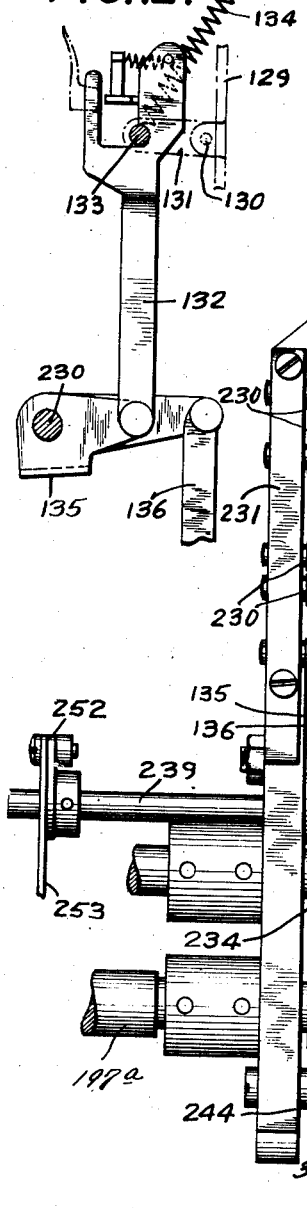
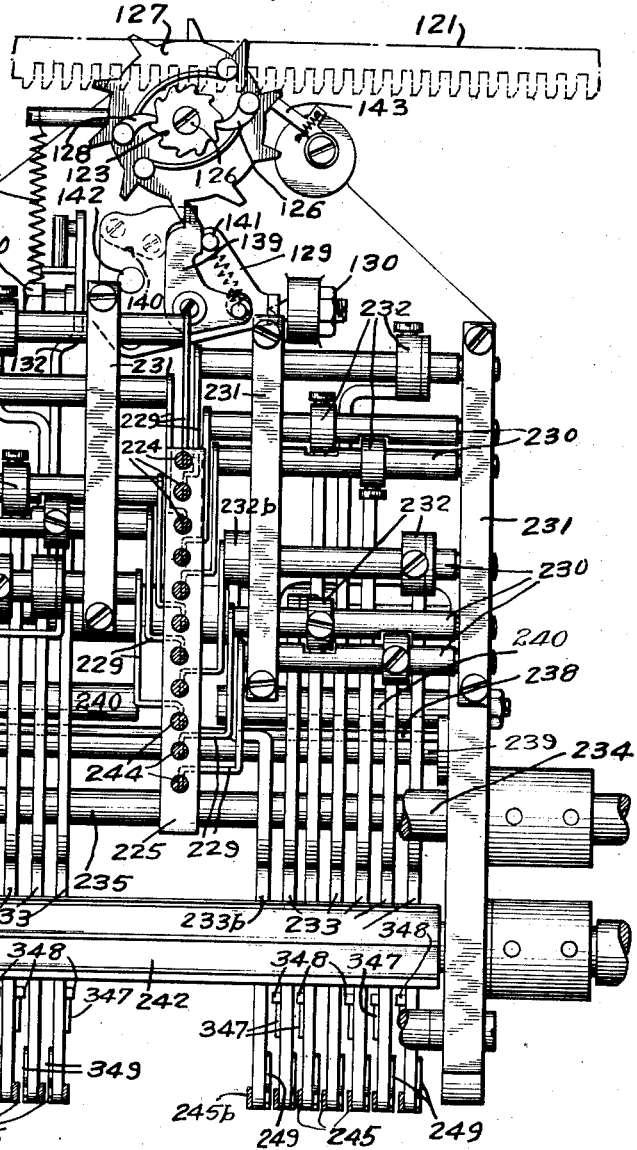
INVENTOR
BY ATTORNEY J. R. Peirce

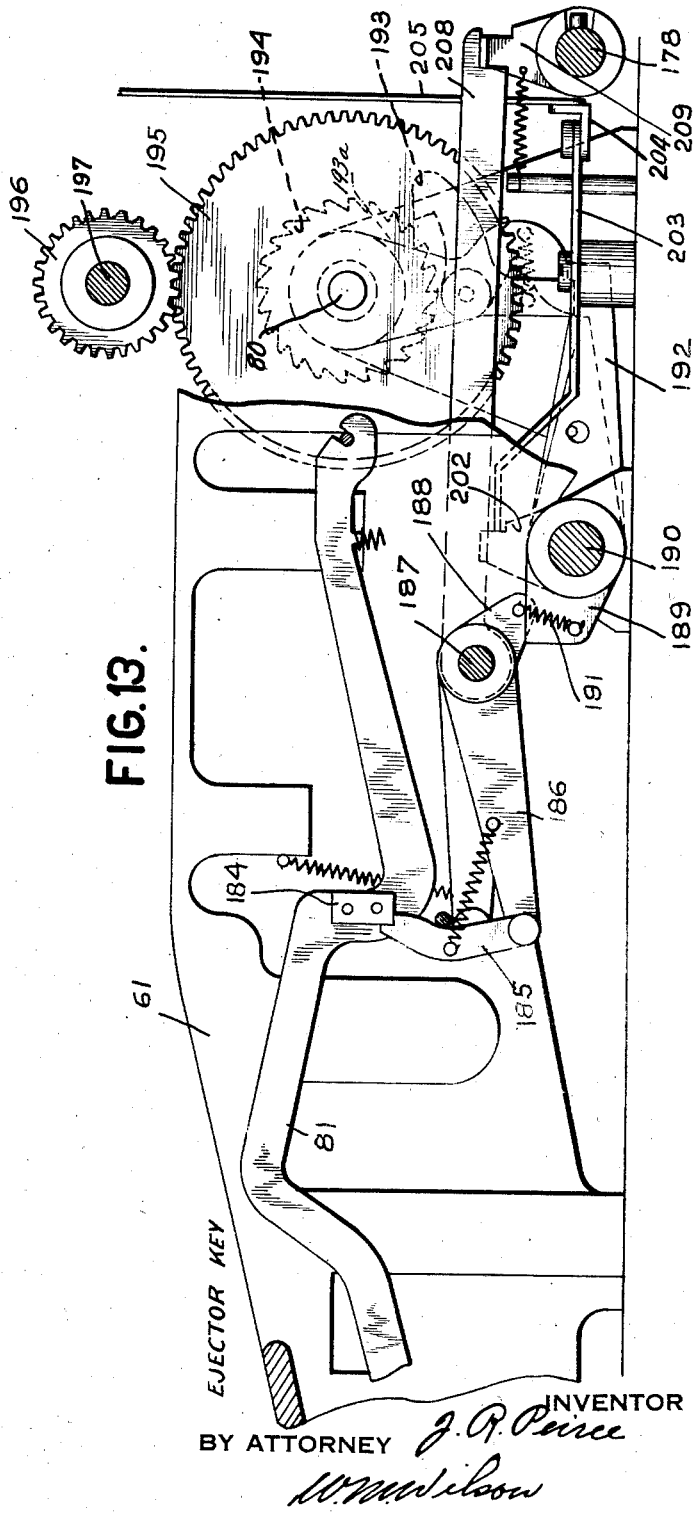

March 2, 1937.  J. R. PEIRCE  2,072,429
ACCOUNTING MACHINE
Filed Aug. 20, 1931   19 Sheets-Sheet 13
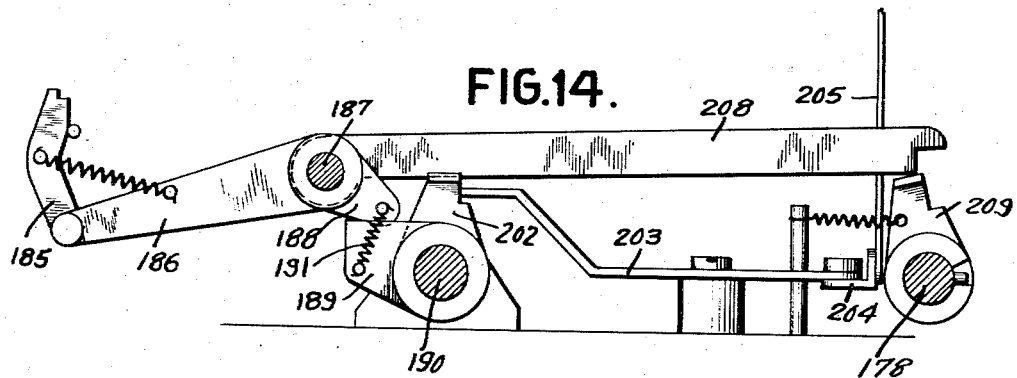
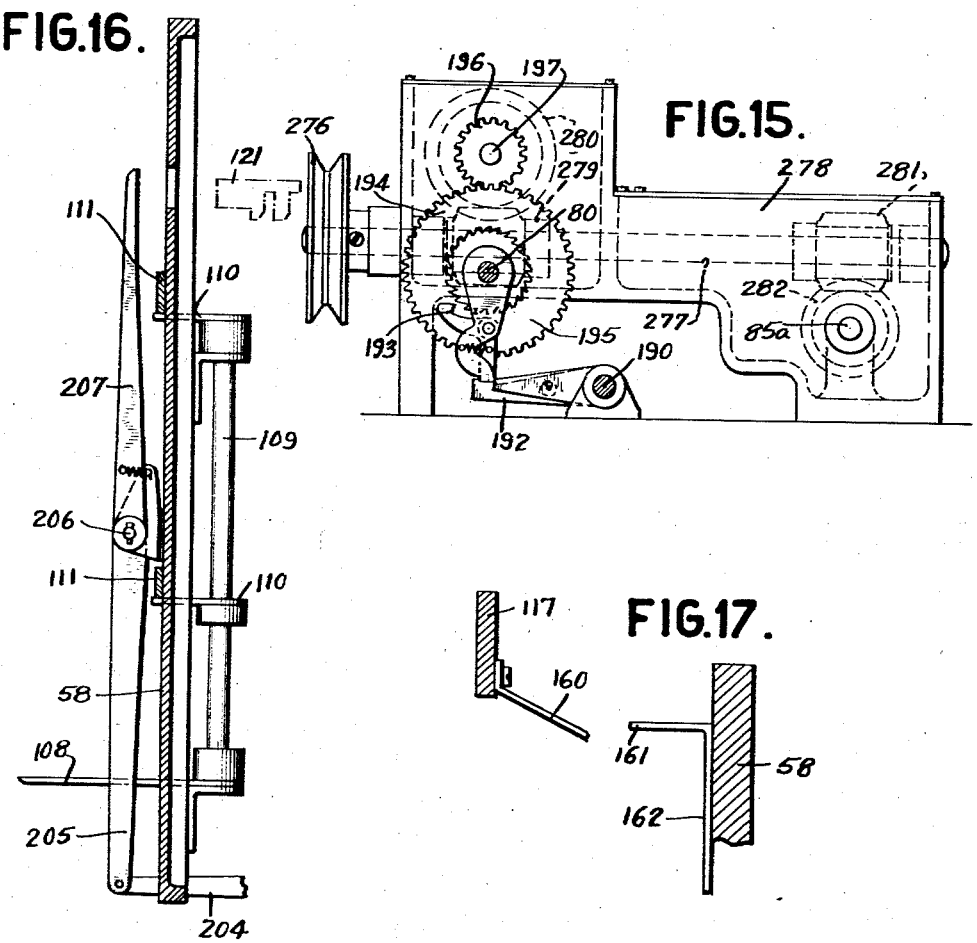
INVENTOR
BY ATTORNEY  J. R. Peirce March 2, 1937. J. R. PEIRCE 2,072,429
ACCOUNTING MACHINE
Filed Aug. 20, 1931  19 Sheets—Sheet 14
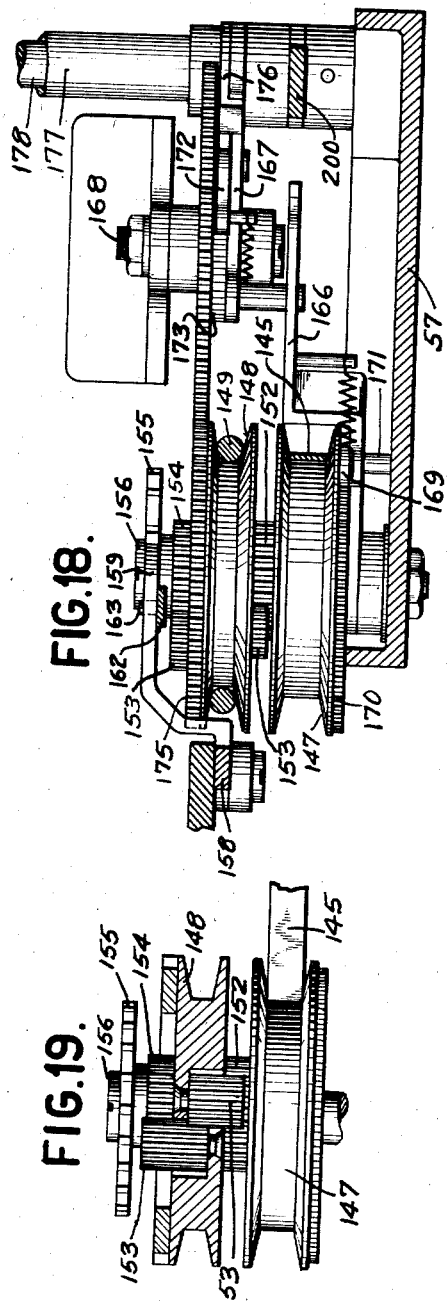
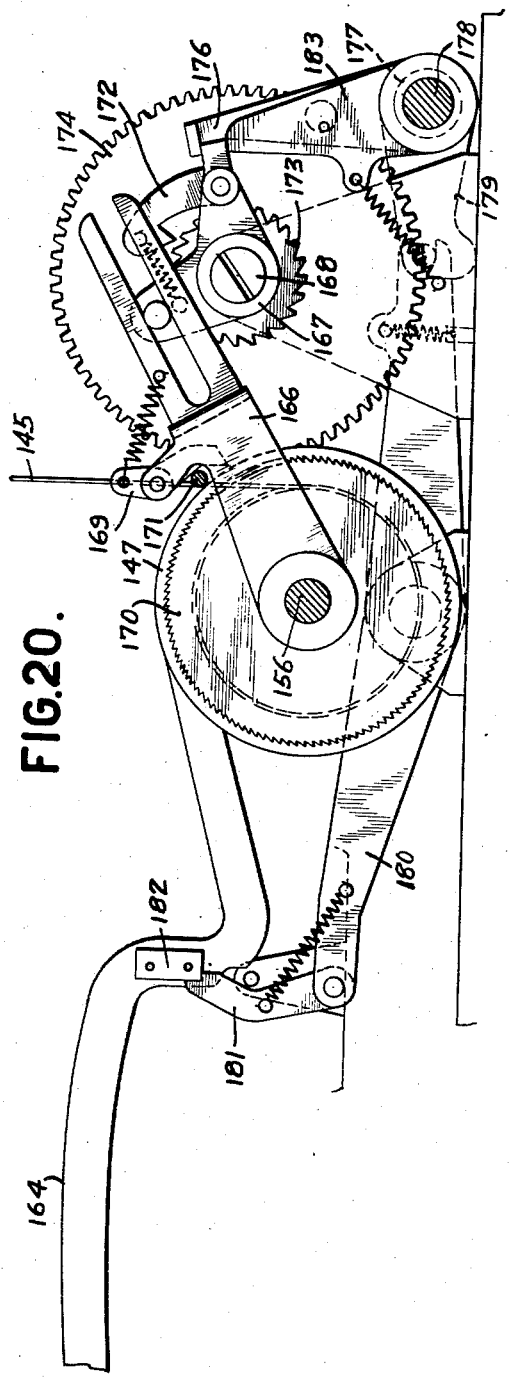
INVENTOR
J. R. Peirce
BY ATTORNEY
W. M. Wilson March 2, 1937.　　　J. R. PEIRCE　　　2,072,429
ACCOUNTING MACHINE
Filed Aug. 20, 1931　　19 Sheets-Sheet 15
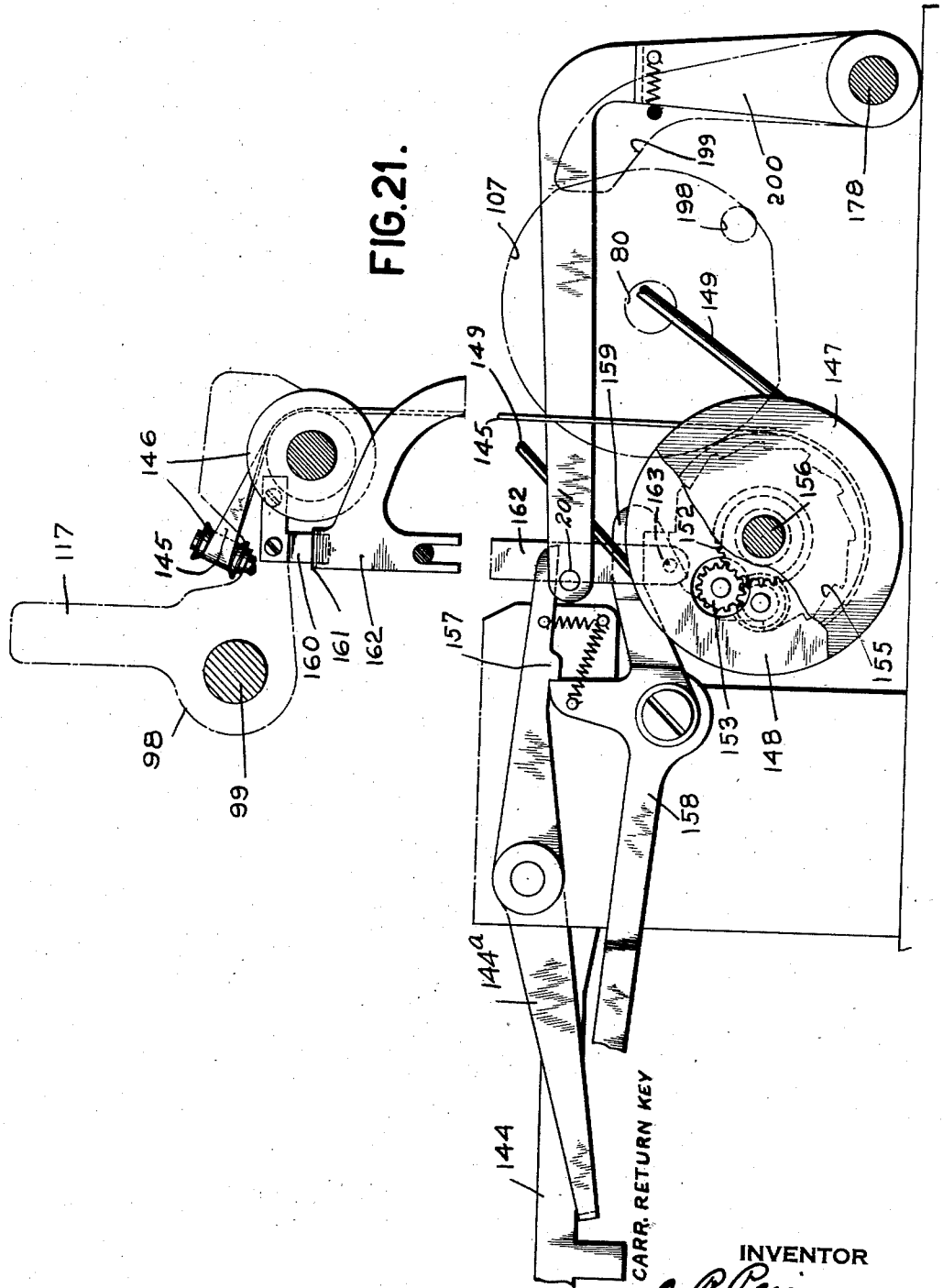

March 2, 1937.                J. R. PEIRCE                2,072,429
                          ACCOUNTING MACHINE
                        Filed Aug. 20, 1931         19 Sheets-Sheet 16
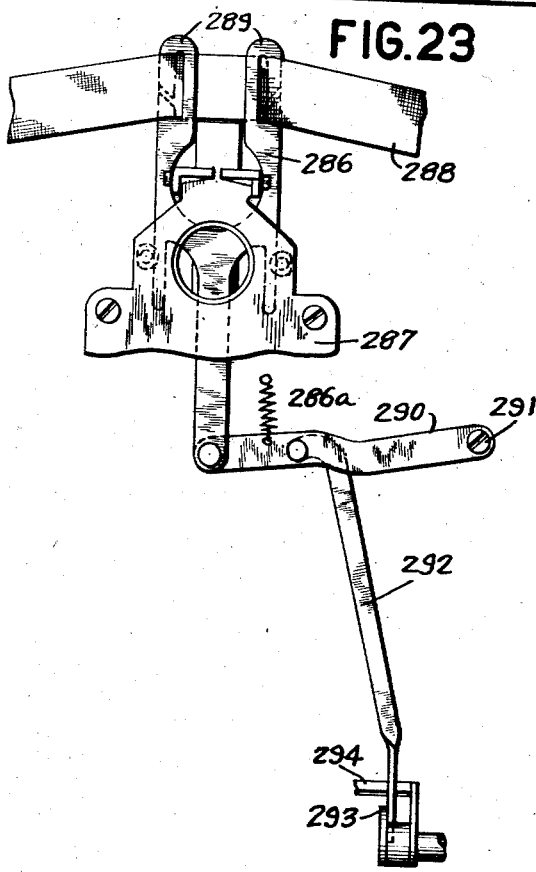
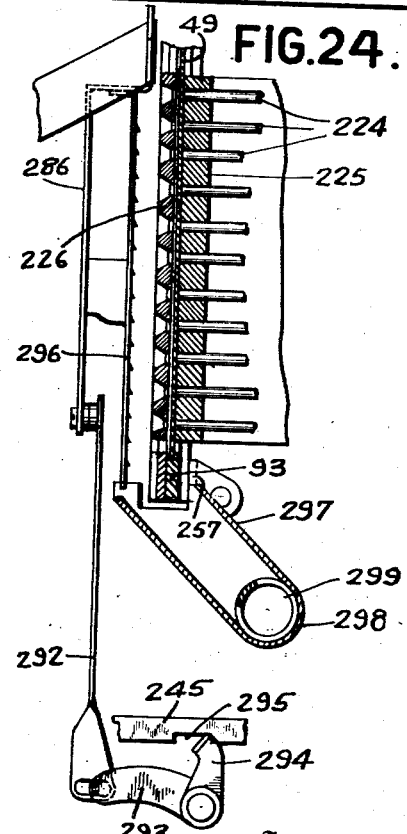

March 2, 1937.  J. R. PEIRCE  2,072,429
ACCOUNTING MACHINE
Filed Aug. 20, 1931   19 Sheets-Sheet 17

INVENTOR
J. R. Peirce
BY ATTORNEY
W. M. Wilson

March 2, 1937.　　　J. R. PEIRCE　　　2,072,429
ACCOUNTING MACHINE
Filed Aug. 20, 1931　　　19 Sheets-Sheet 18

INVENTOR
J. R. Peirce
BY ATTORNEY
W. M. Wilson

March 2, 1937.
J. R. PEIRCE
2,072,429
ACCOUNTING MACHINE
Filed Aug. 20, 1931
19 Sheets-Sheet 10
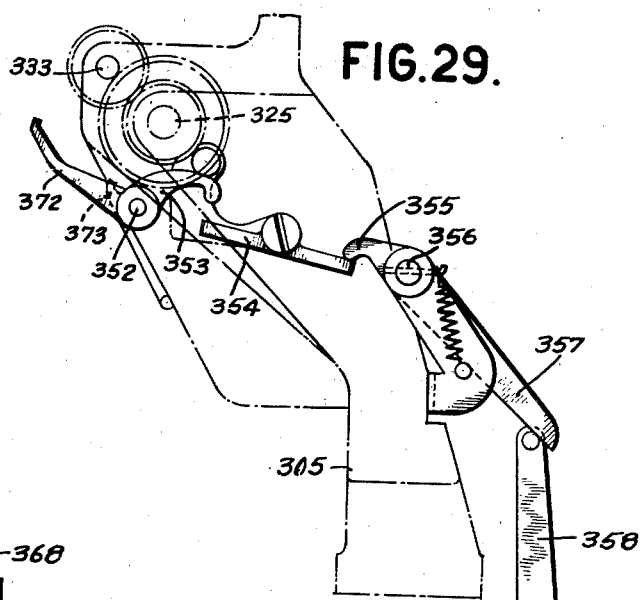
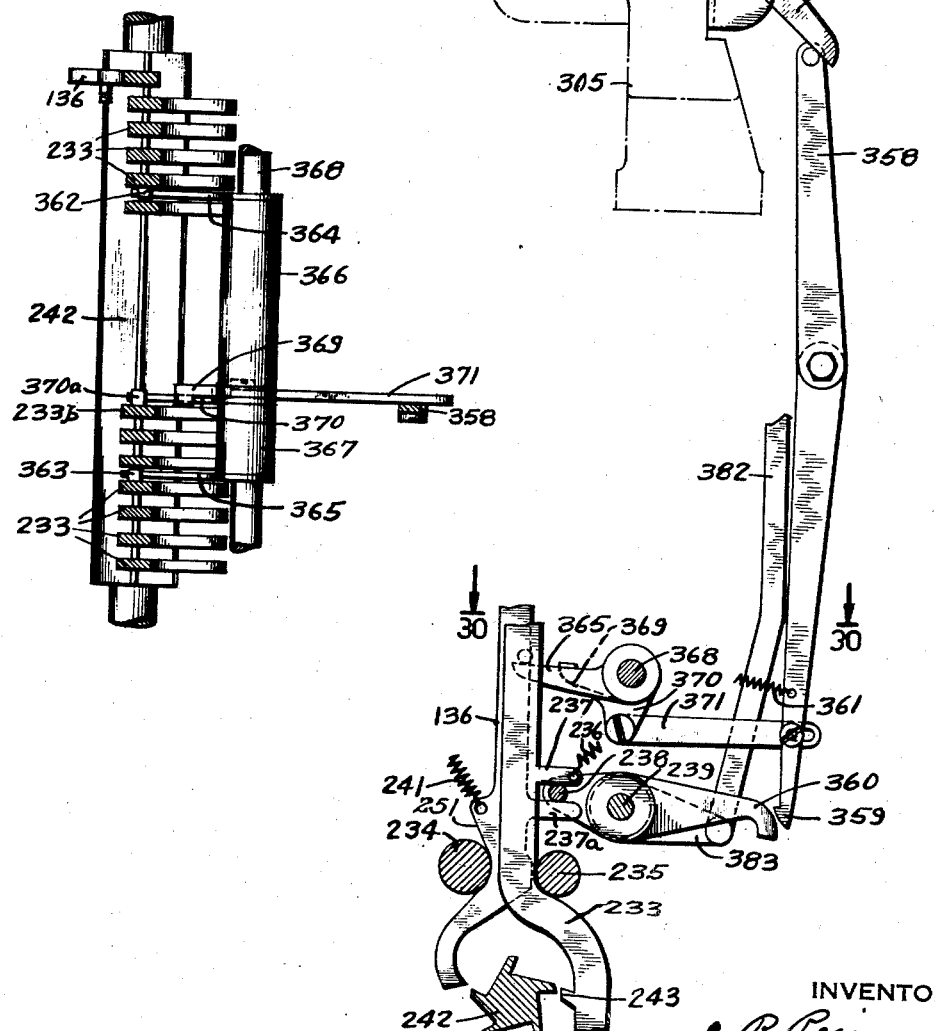

Patented Mar. 2, 1937

2,072,429

UNITED STATES PATENT OFFICE 2,072,429

ACCOUNTING MACHINE

John Royden Peirce, New York, N. Y., assignor, by mesne assignments, to International Business Machines Corporation, New York, N. Y., a corporation of New York Application August 20, 1931, Serial No. 558,267

9 Claims. (Cl. 235—59)

This invention relates to accounting machines in general.

Accountants and statisticians commonly make use of perforated records in compiling accounting and statistical information of various kinds. The procedure heretofore has been to perforate record cards with the desired data, a separate card being devoted to data relating to a particular item, transaction, or operation, and, after the records have been perforated, to pass them through a record-controlled machine of the Hollerith or Powers type for the purpose of securing totals of the various classes or groups of items represented by the perforated cards. Usually the record-controlled machine may be arranged to print both the items and totals in convenient tabular form so as to put the data into a form which may be readily analyzed mentally by the accountant or statistician.

The perforating machines in use up to the present time have been confined in their arrangement to mechanism for merely perforating the data in the cards, the tabulating operation being accomplished by a separate machine so that two separate steps have been required to secure the totals of certain classes or groups of items. It has been proposed to simplify the above procedure by combining the perforating operation with the tabulating operation and thereby effect a considerable saving in time and labor cost in handling the cards as well as a saving in the cost of the machines for the two operations.

Attempts made heretofore to simplify the procedure and effect a saving of time and the cost of the necessary equipment have so far, for the most part, been directed toward equipping record-controlled machines with perforating mechanism controlled by manually operated keys or settable finger levers.

Such constructions, while they accomplish the mechanical results desired, namely, the perforating and tabulating of the cards in a single machine operation, are nevertheless uneconomical and makeshifts because they take the form of mere additions to the tabulating machine without simplifying the machine in any respect or reducing its cost. Furthermore, the saving in time and labor is relatively slight for the reason that the operation of perforating the record cards is, relatively speaking, a slow operation compared to the tabulating of the cards and necessarily limited by the speed and skill of the operator.

Tabulating machines are usually designed with the object in mind of cutting down to a minimum the time necessary to tabulate the cards and, when a manually controlled perforating mechanism is included in the tabulating machine, the relatively expensive and fast tabulating machine cannot be used to best advantage since it must be operated at a speed which is a fraction of the speed for which it was designed. This means that a complete tabulating machine must be provided for every operator engaged in perforating the cards whereas, in the ordinary installation, several perforating machines and operators are needed to keep a single tabulating machine yielding a return on its investment cost.

In the preparation of accounting and statistical reports it is often very advantageous to secure preliminary reports of business conditions such as the trend of the various commodity markets, agriculture, and the stock markets well in advance of the final reports. Preliminary reports are often of great importance, particularly in some classes of business in which the availability of advance information as to the condition of the business frequently may give the exeecutives in an organization an advantage over competitors thereby enabling the executives to foretell the trend of the business and formulate a policy which may give the organization a decided lead over its competitors or forestall undesirable situations which often arise before the final reports are available.

Ordinarily it would be necessary to wait until a fair share of the records have been prepared before they can be tabulated owing to the great difference in speed of operation between the card punching machines and the tabulating machines. It will thus be seen that a machine capable of giving the results as fast as the cards are prepared will be very advantageous, particularly where considerations of economy preclude the installation of a large number of punching and tabulating machines as would be necessary to enable the reports to be quickly secured by the conventional methods.

This invention is designed to provide a machine capable of summarizing the records as they are prepared so that preliminary reports may be quickly prepared as soon as a batch of records have been punched and, if desired, capable of operation to punch and print total or summary cards which subsequently may be used in the tabulating machine in preparing a comprehensive report without the necessity of running all of the cards of a class or group through the machine.

The present invention also aims to provide a machine which may be built at a lower cost than a tabulating machine of any of the well-known types and is capable of not only perforating the cards with the desired data but is also adapted to print the data on the record card and, if desired, to accumulate totals of certain classes or groups of items either additively or subtractively at the will of the operator.

An object of this invention is to provide a machine capable of punching total cards.

A further object is to provide a machine in which all of the operations are performed by power controlled by suitable manipulative devices such as keys thereby increasing the speed at which the machine may be operated and reducing the amount of work required of the operator.

A further object is to provide an improved power driven amount entering and accumulating mechanism, which is rapid and positive in its action, is capable of accumulating amounts either additively or subtractively, or is disconnectable, according to the will of the operator.

Other objects are to improve the general construction of accounting machines with the purpose in mind of cheapening and simplifying the construction, reducing the number of parts, and securing improved and more reliable operation.

Various other objects, advantages, or features of the invention will be particularly pointed out in the following specification and claims or will be clear after a study thereof and of the accompanying drawings which illustrate an embodiment of the invention considered at present to be best suited to meet conditions found in practice.

In the drawings:

Figure 8 is a plan view showing the connections to the keys controlling the operation of the machine.

Figure 11 is a front elevation of the punches and the card carriage escapement mechanism.

Figure 12 is a detail view of certain parts of the card carriage escapement mechanism.

Figure 13 is a view illustrating the mechanism controlled by the ejector key.

Figure 14 is a view showing in tripped position certain parts controlled by the ejector key.

Figure 15 is a view illustrating the driving connections from the motor.

Figure 16 is a detail view in vertical section of certain mechanism operated by the card carriage when it has reached the limit of its leftward travel.

Figure 17 is a detail showing the members for controlling disabling of the carriage return mechanism when the carriage has completed its return movement.

Figure 18 is a top plan view, partly in section of the carriage return and back spacing mechanism.

Figure 19 is a view showing the construction of the carriage return clutch.

Figure 20 is a view in elevation showing the back spacing key and mechanism controlled thereby.

Figure 21 is an elevation showing the connections controlled by the carriage return key.

Figure 22 illustrates a record card after being perforated and printed by a machine constructed according to the present invention.

Figure 23 is a front elevation of the type bar guide and ribbon vibrator.

Figure 24 is a vertical section showing the ribbon vibrator, the punches and the device for stripping the punchings from the die of the punches.

Figure 29 is a view showing the mechanism for preventing the card carriage and totalizer truck from escaping until the amount entering mechanism has completed an operation upon an individual totalizer wheel.

Figure 30 is a horizontal section taken on the line 30—30 in Figure 29.

Figure 1:
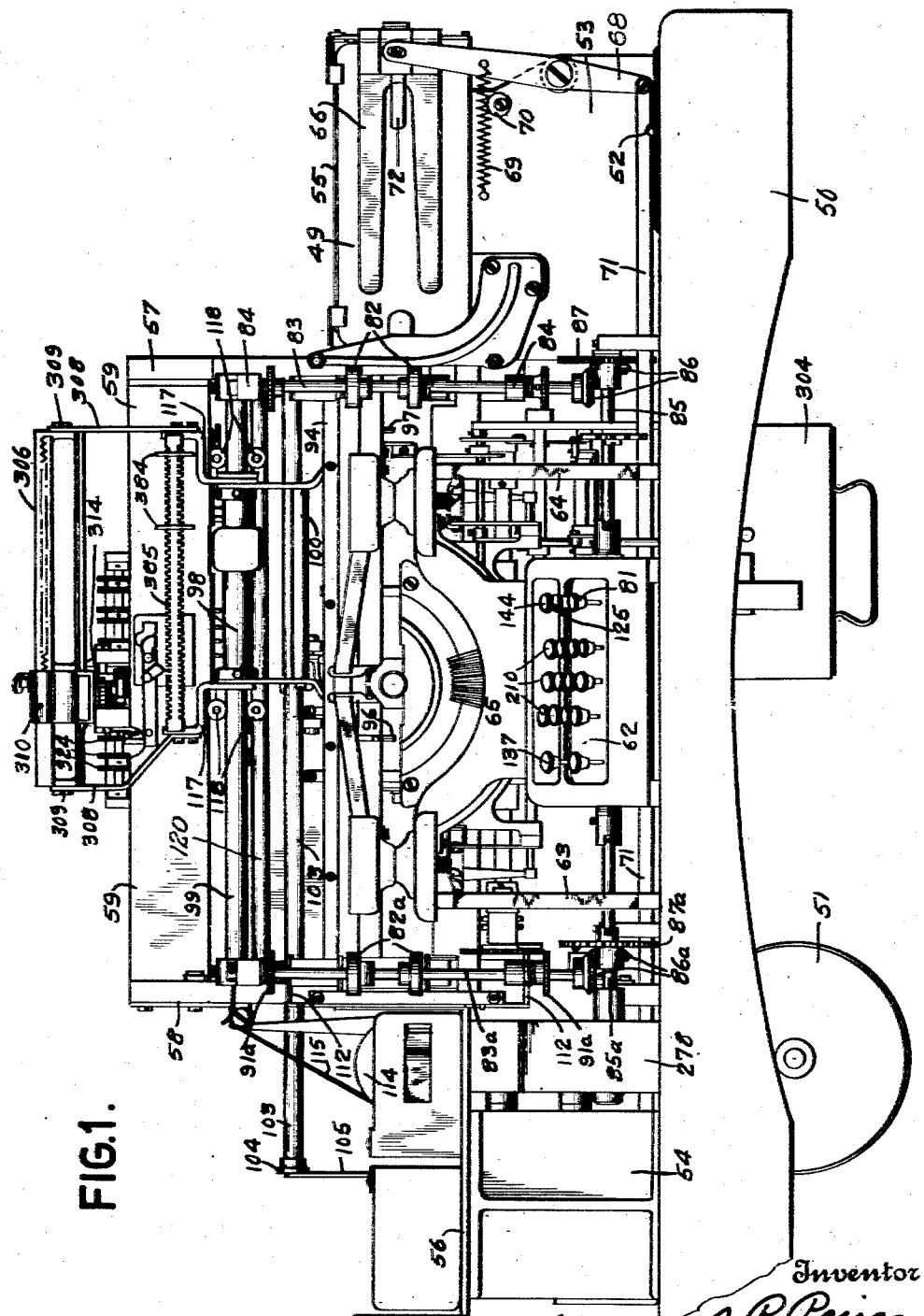
Figure 1 is a front elevation of the machine.

This invention is an improvement in the machine illustrated and described in application Serial No. 442,347, filed April 7, 1930, by John Royden Peirce, now Patent No. 1,867,025 granted July 12, 1932, and for a detailed explanation of the general construction and operation of the machine reference may be had to said application. A brief general description of the machine will be given in order to enable a clear understanding to be had of the invention.

The record card

Before proceeding with a description of the machine the form of record card used in connection with the machine will be described by reference to Figure 22 which illustrates a specimen record card after it has been passed through the machine.

It will be observed that the record card 49 is similar to the now well known Hollerith card and is likewise divided into vertical columns, each column being subdivided into twelve index-point positions. The eleventh and twelfth index-point positions are, as is usually the case, located at the tops of the card columns. The index-point value of a data designating perforation appearing in any card column is printed at the twelfth index-point position of the same column except for a perforation representing "12" for which there is no character printed, there not being enough room at the top of the card to print the value of said perforation. The limited amount of space available between the "12" index-points and the top edge of the card makes it necessary to print the data represented by perforations in the several card columns in the "12" index point positions of the columns and, since it is desirable to be able to perforate in the twelfth position, only eleven punches have been provided and provision has been made to shift the card relative to the punches whereby to utilize the punch for the eleventh index-point position to perforate in the twelfth index-point position.

*General description*

The machine is provided with a magazine for blank record cards and picker mechanism for removing the blank cards one at a time from the supply magazine and presenting one edge of each card so removed to feeding mechanism which conveys the cards into a position to be engaged by members carried by a card carriage. The card carriage feeds each card column-by-column past the perforating and printing zone where key-controlled mechanism perforates and prints the desired data in the card. After the last column on the card has been punched, key controlled ejecting mechanism may be brought into action to deliver the perforated card to a storage magazine where the perforated cards are stacked in the same order which they formerly occupied in the supply magazine. While data assigned to certain fields of the record cards is being perforated, accumulating mechanism may be brought into action to accumulate additively or subtractively the data printed and perforated in such fields so that totals may be secured of the data concerned thereby saving the time ordinarily necessary to analyze and accumulate such data by means of a record-controlled accounting and statistical machine of any of the well-known types. The machine may also be provided with tabular stop mechanism like that in Patent No. 1,867,025, by means of which the card carriage may be automatically moved to bring a given field into the perforating and printing zone without requiring successive operations of the carriage spacing key or tabular stop key to skip the intervening card columns or fields. The perforating, printing, amount entering, and card feeding and ejecting mechanisms are all key controlled and operated by means of the power from a suitable motor mounted in the machine.

The card magazines, card picking mechanism, card feeding and ejecting mechanism, the card carriage, and the printing mechanism are all fully described in the application of John Royden Peirce already cited herein, therefore, only a brief description need be given herein of such mechanisms.

*General details of construction*

Figure 2:
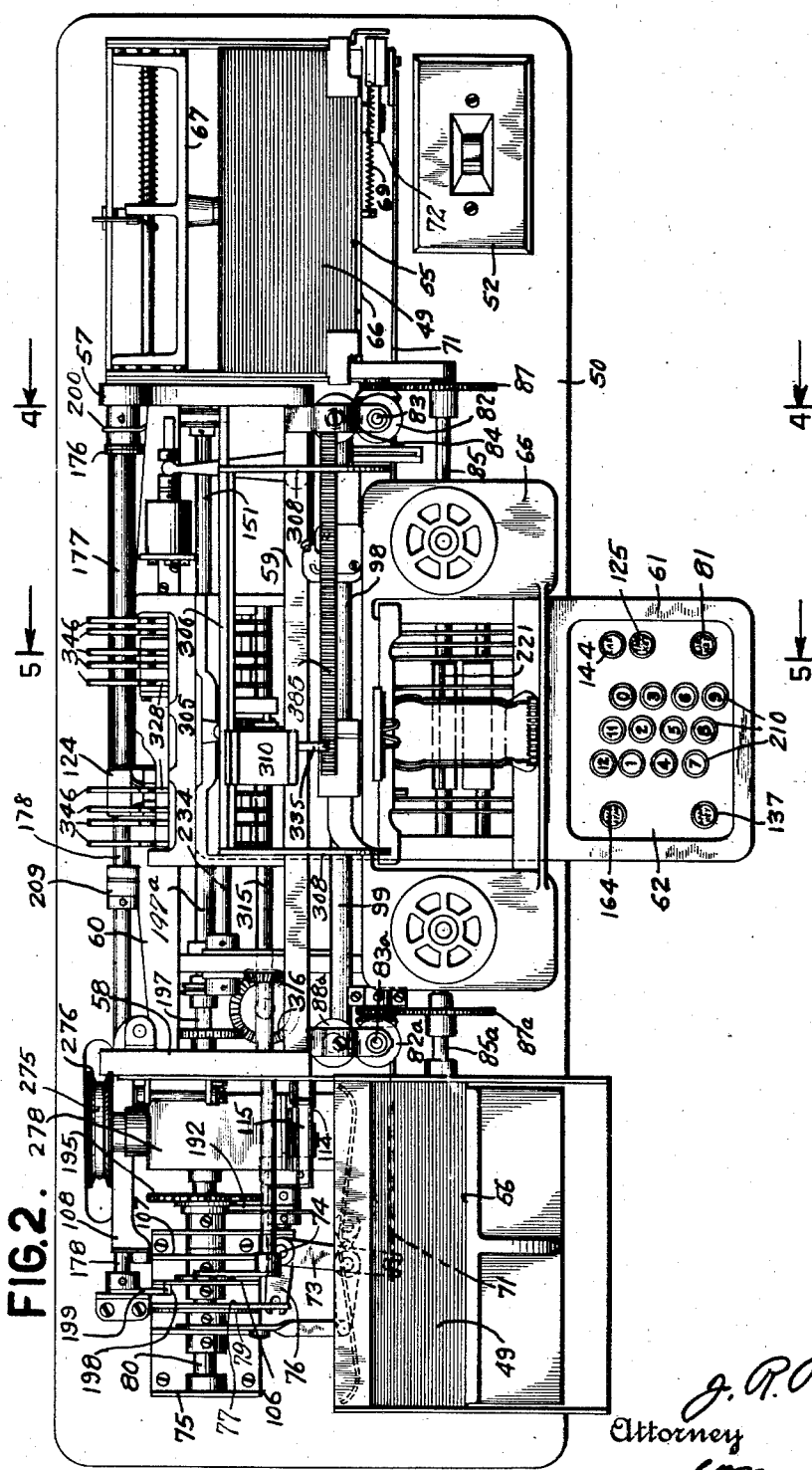
Figure 2 is a plan view.

The machine is mounted upon the base 50 (Figures 1 to 5), from the under side of which is suspended the driving motor 51, the latter being controlled by means of a switch 52 located near the front right-hand corner of the base 50 (Figure 2). The frames 53, 54, respectively, support the supply magazine 55 for the blank record cards 49 and the storage magazine 56 for the perforated cards while the frames 57, 58 support the greater part of the mechanisms of the machine, and are joined together by cross frames 59, 60, respectively. A frame 61, mounted on the base 50, near the middle of the machine, supports the keyboard 62 and the power drive mechanism for the typebars. Intermediate frames 63, 64 support the frame 65 in which are mounted the typebars and ribbon mechanism.

*Picker mechanism and card feeding mechanism*

The blank record cars 49 are removed from the magazine 55 one at a time by means of a picker device 66 against the rear face of which the blank cards are pressed by means of a spring actuated follower 67 (Figure 2). The picker device 66 (Figure 1) has a picker blade adjusted to catch the right edge of the foremost card and push the card to the left and is actuated by a lever 68 pivoted intermediate its ends to the frame 53. A spring 69 normally tends to draw the picker device 66 to the left (Figure 1) toward an adjustable stop 70 but is not ordinarily effective owing to the restraint imposed on lever 68 by a link 71 pivoted to the lower end of lever 68.

The picker device is slidably mounted upon a stub shaft 72 attached to a fixed part of the frame.

The link 71 extends to the left (Figures 1 and 2) and is pivotally connected to an arm 73 (Figs. 2, 3, and 7) fixed to a vertical rock shaft 74 journalled in a frame 75 mounted on the base 50. An arm 76 fixed to shaft 74 has a pivotal connection to a slide 77 having a cam roller 78 cooperating with a cam 79 fixed to a shaft 80 journalled in the frame 75. The profile of the cam 79 is such that each time the shaft 80 makes one revolution the link 71 will be permitted to move to the right (Figures 1 and 2) owing to the tension of spring 69 and the picker devices 66 will carry the foremost blank card in the magazine 55 a distance to the left sufficient to bring the left edge of said card into position to be gripped by the card feeding rollers. The shaft 80 is caused to revolve once after each card has been perforated and is controlled by the ejector key 81. Other functions of the shaft 80 will be explained hereinafter in the description of the card feeding and ejecting mechanism.

*Card feeding and ejecting mechanism*

The card feeding mechanism includes a pair of rollers 82 (Figures 1, 2 and 4) mounted upon a vertical shaft 83 which is journalled in lugs 84 integral with the frame 57. The shaft 83 is driven continuously by a horizontal shaft 85 through gear connections comprising bevel gears 86 and spur gears 87 (Figures 1 and 2). Cooperating with the rollers 82 is a pair of rollers 88 (Figure 4) each of which is mounted upon a short shaft 89 journalled in lugs 90 and the lug 84. The rollers 88 are driven in unison with rollers 82 by means of helical gears 91 connecting the shafts 89 with the shaft 83.

Figure 9:
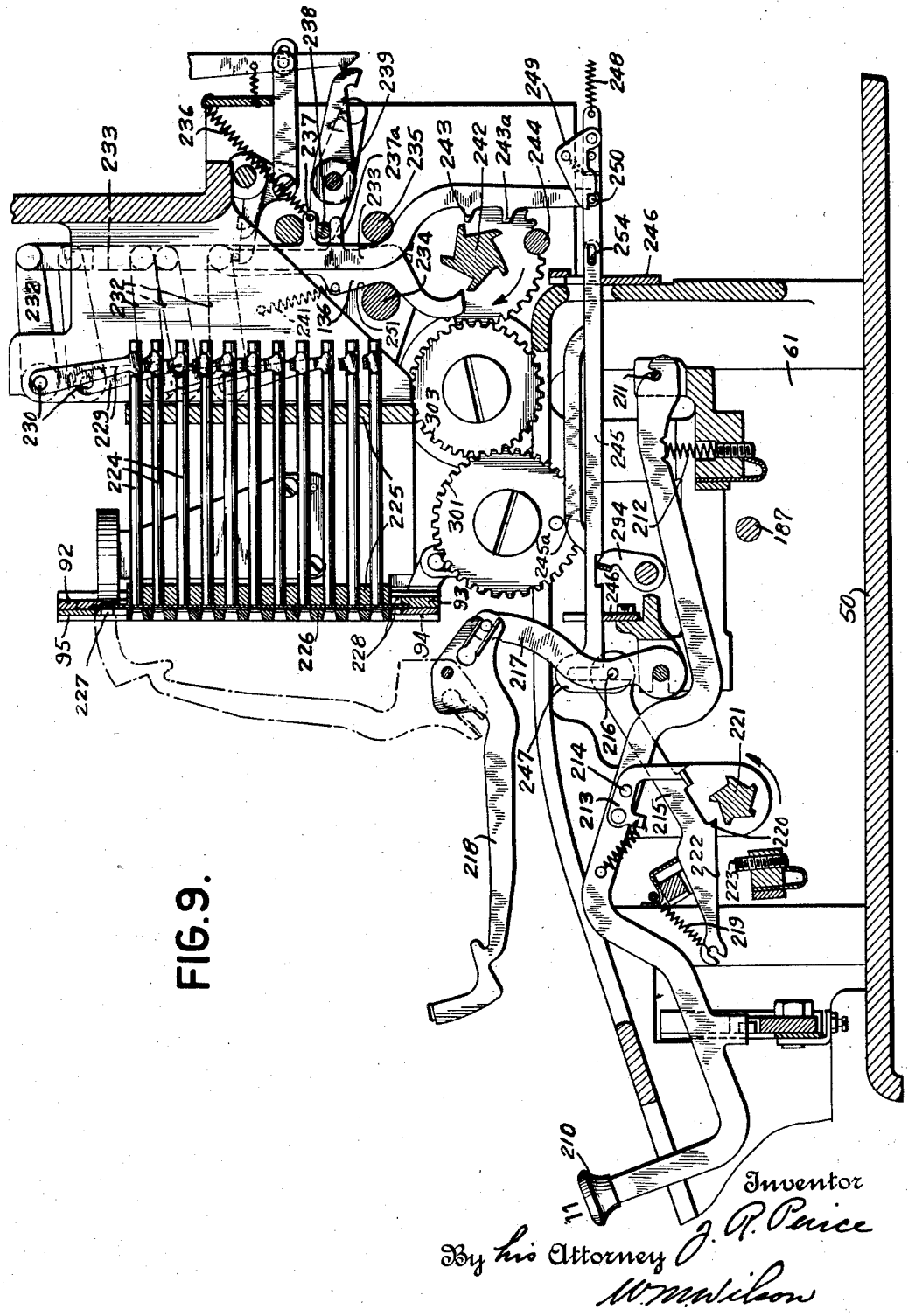
Figure 9 is a vertical section showing the mechanism controlled by the "11" key and also illustrates the construction of the mechanism for operating the punches and typebars under control of the keys.

Each card fed from the supply magazine 55 by the picker mechanism is securely gripped by the feeding rollers 82, 88 and fed toward the left (Figure 6) between longitudinal grooves in two parallel members 92, 93 (Figures 9 and 10) forming part of a vertically movable card guiding frame 94. The front wall of the groove formed in the upper member 92 is composed of a strip of transparent material 95 (Figure 6) which makes the upper front edge of the card clearly visible and enables the operator to verify the correctness of the characters as they are printed in the "12" index-point positions.

The frame 94 is normally in the position shown in Figures 5, 6, 9 and 10 but under certain circumstances is dropped a distance equal to the distance between the "11" and "12" index points in the record card. The mechanism for accomplishing this result will be explained later herein and for the present it will be assumed that the frame remains in its normal or upper position.

While the card is fed to the left by rollers 82, 88 it is guided by grooves in members 92, 93 until the left edge of the card strikes one arm 96 of a pair of arms 96, 97 (Figures 1, 4, 5 and 6) pivotally mounted in the card carriage 98 which is slidably mounted upon a shaft 99 extending between the frames 57, 58. The arms 96, 97 are rigidly joined together by a cross rod 100 and are provided with notches 101 (Figure 5) embracing a rod 102 forming part of a bail rigidly mounted on shaft 103. The shaft 103 is journalled in the frames 57, 58 and at its left end has fixed thereto an arm 104 (Figures 1 and 3) to which is pivoted a link 105 operated by a cam 106 fixed to shaft 80. During the feeding of a blank card from the supply magazine 55 the end of arm 96 extends into the path of the left edge of the card fed by the rollers while the arm 97, being shorter, permits free passage of said card until it is stopped by arm 96.

The shaft 80, as stated hereinbefore, turns one revolution during the card feeding and ejecting cycle and the cam 106 is turned to rock the arms 96, 97 forwardly (Figure 6) after the card strikes the arm 96 until the arm 97 projects forwardly of the right edge of the card. When the shaft 80 comes to rest the arms 96, 97 remain in their forward positions so that it will be seen that the card therebetween will be moved with the carriage 98 in its leftward movement during punching, printing, and adding operations until the last column on the card has been perforated and said card will be guided in such leftward movement by the grooves in members 92, 93.

When the last column of the card has been perforated, the left edge of the card will be between feeding rollers 82a, 88a, (Figures 1 to 3) similar to the rollers 82, 88 except that the rollers 88a do not normally coact with rollers 82a to feed the card further to the left but are adapted to be brought together to feed said card during the card feeding and ejecting cycle by mechanism now to be described.

Figure 3:
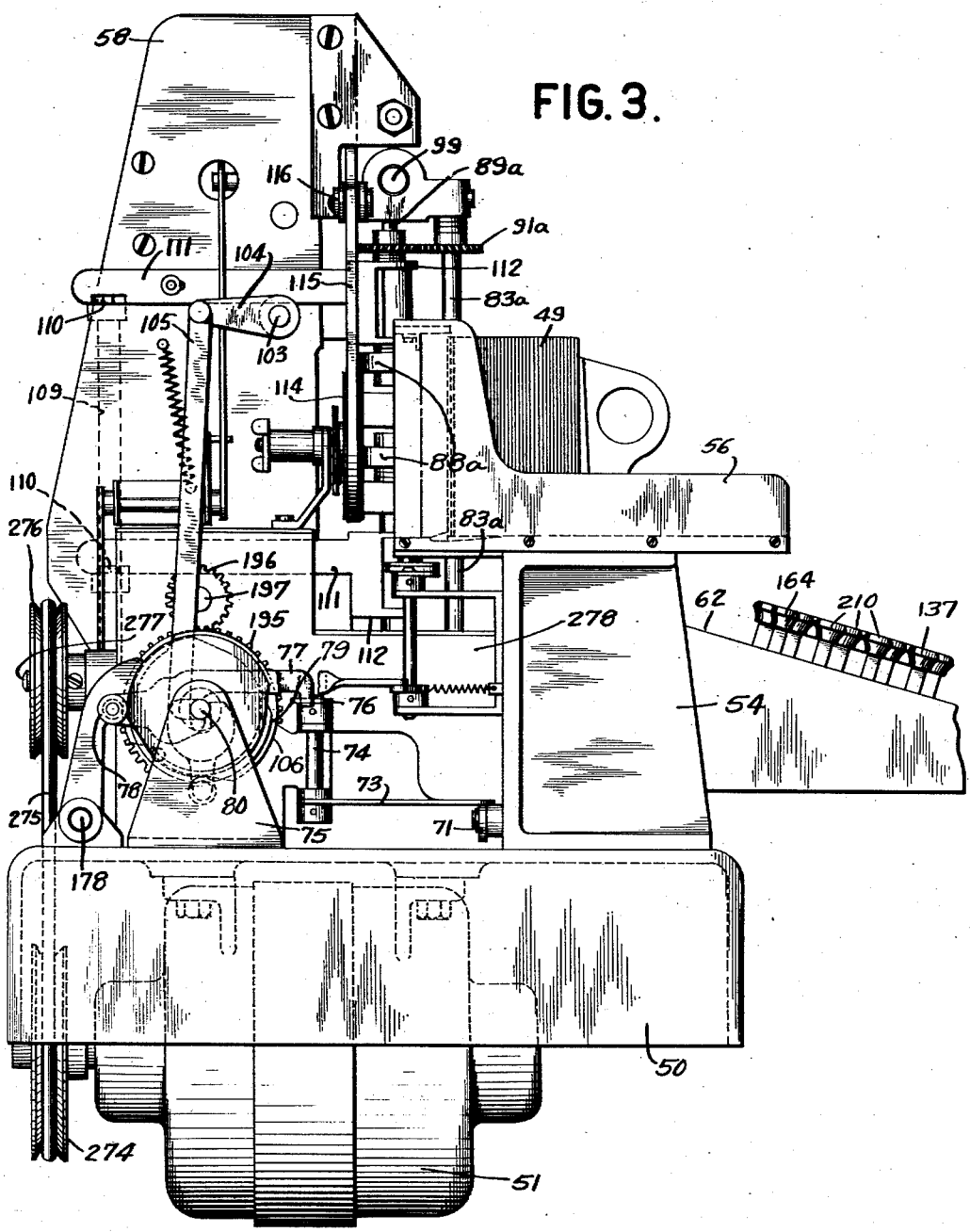
Figure 3 is an elevation of the left side of the machine.
Figure 4:
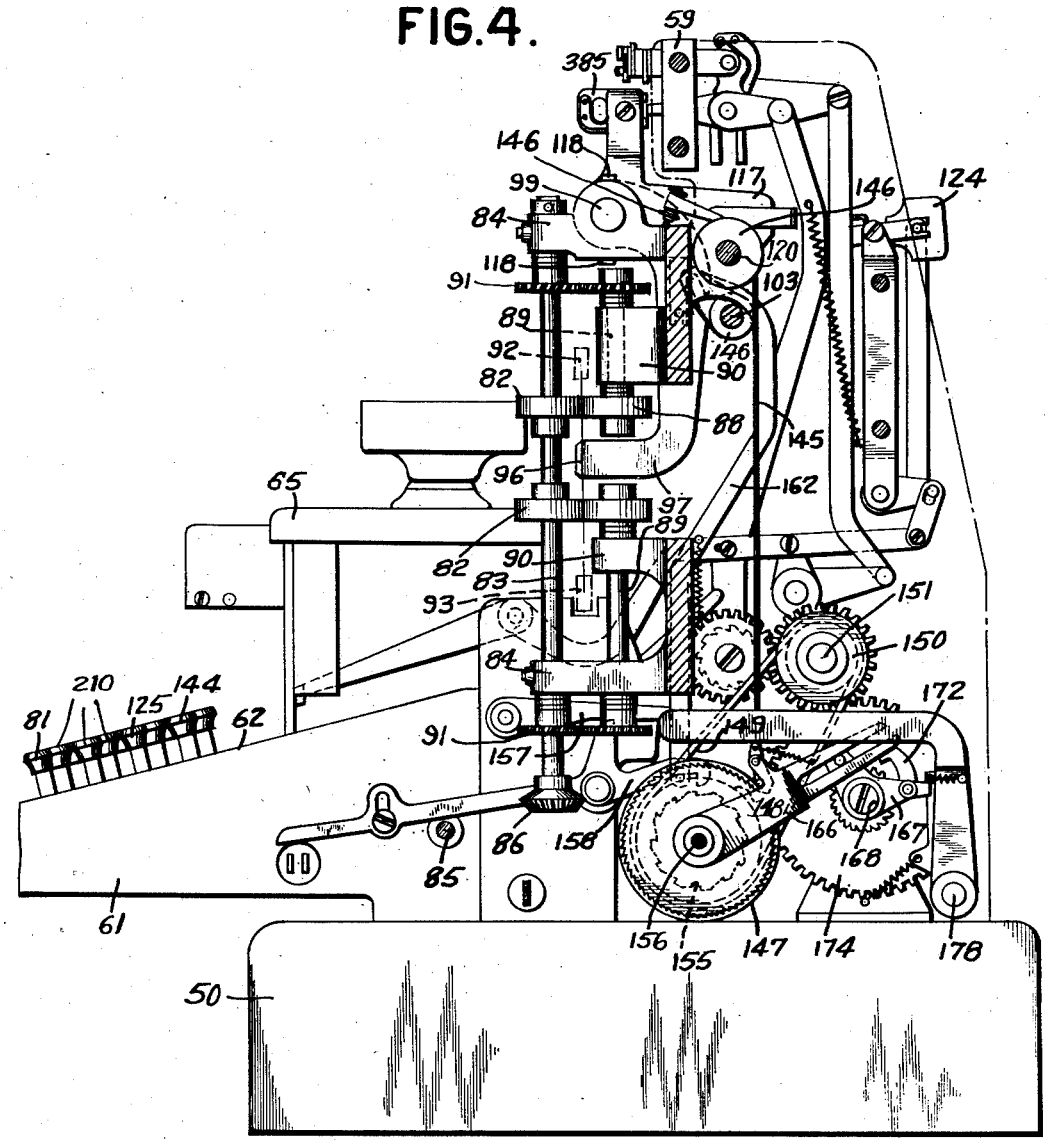
Figure 4 is a vertical section taken substantially on the line 4—4 of Figure 2.
Figure 7:
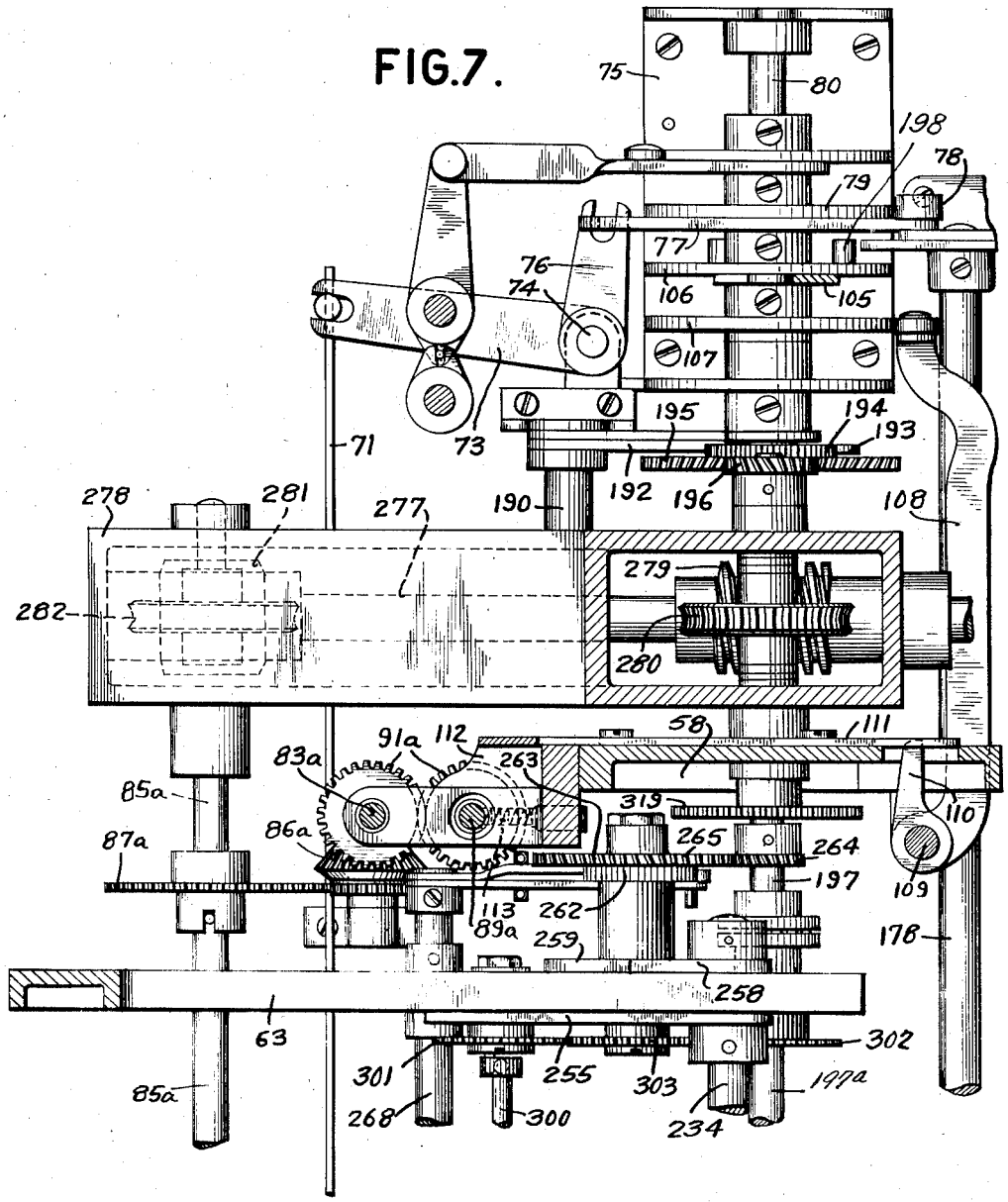
Figure 7 is a plan view of the cam shaft, and the driving connections for the cam shaft and certain shafts for operating the punches, type bars, and amount entering mechanism.

The engaging of the rollers 82a, 88a to feed the card out of the machine is effected by a cam 107 (Figures 2 and 7) rigidly mounted on shaft 80 through mechanism operated by a cam follower 108 which cooperates with cam 107 and is rigidly mounted on a vertically extending shaft 109 journalled in frame 58 and having arms 110 (Figures 3 and 7) integral therewith. Each of the arms 110 engages one of a pair of slides 111 mounted for horizontal movement in the frame 58 and normally hold the slides in their rearmost position as shown in Figures 3 and 7. Each slide 111 is provided with yoke-like extensions 112 (Figure 3) in which are journalled shafts 89a carrying the rollers 88a while the cooperating rollers 82a are mounted on a vertical shaft 83a.

The latter shaft is constantly driven through gearing 86a, 87a (Figures 1, 2 and 7) similar to the gearing 86, 87 while gearing 91a causes shafts 89a and rollers 88a to be driven with shaft 83a and rollers 82a, one of the gears 87a being mounted on a shaft 85a which also drives shaft 85 through suitable couplings and the fluted actuator for the type bars. The shaft 89a and rollers 88a are pressed toward shaft 83a and rollers 82a by springs 113 but said rollers do not grip the card owing to the fact that the arms 110 hold slides 111 in their rearward position without, however, disengaging the gearing 91a which is designed to permit the rollers 82a, 88a to revolve together without gripping the card.

At the beginning of the card feeding and ejecting cycle the cam 106 rocks the arms 96, 97 rearwardly a distance sufficient to permit the card to pass further to the left into the storage magazine 56 and thereafter the cam 107 permits the follower 108 to move forwardly a distance sufficient to bring rollers 82a, 88a together to grip the card and convey it into said magazine.

*Card carriage*

The card carriage 98 is drawn to the left by an adjustably tensionable spring drum 114 (Figures 1, 2, 3 and 6) upon which is wound a tape 115, passing over a pulley 116 journaled in frame 58, and attached to the left end of the carriage. The carriage is constructed of a pair of side frames 117 (Figures 1 and 6) rigidly joined by a tube surrounding shaft 99 and is guided on said shaft by means of anti-friction rollers 118 mounted in the carriage. The rear end of the frames 117 are provided with rearwardly extending hooked portions 119 (Figure 5) engaging a cross shaft 120 which serves to steady the carriage frame and hold it in upright position.

Figure 5:
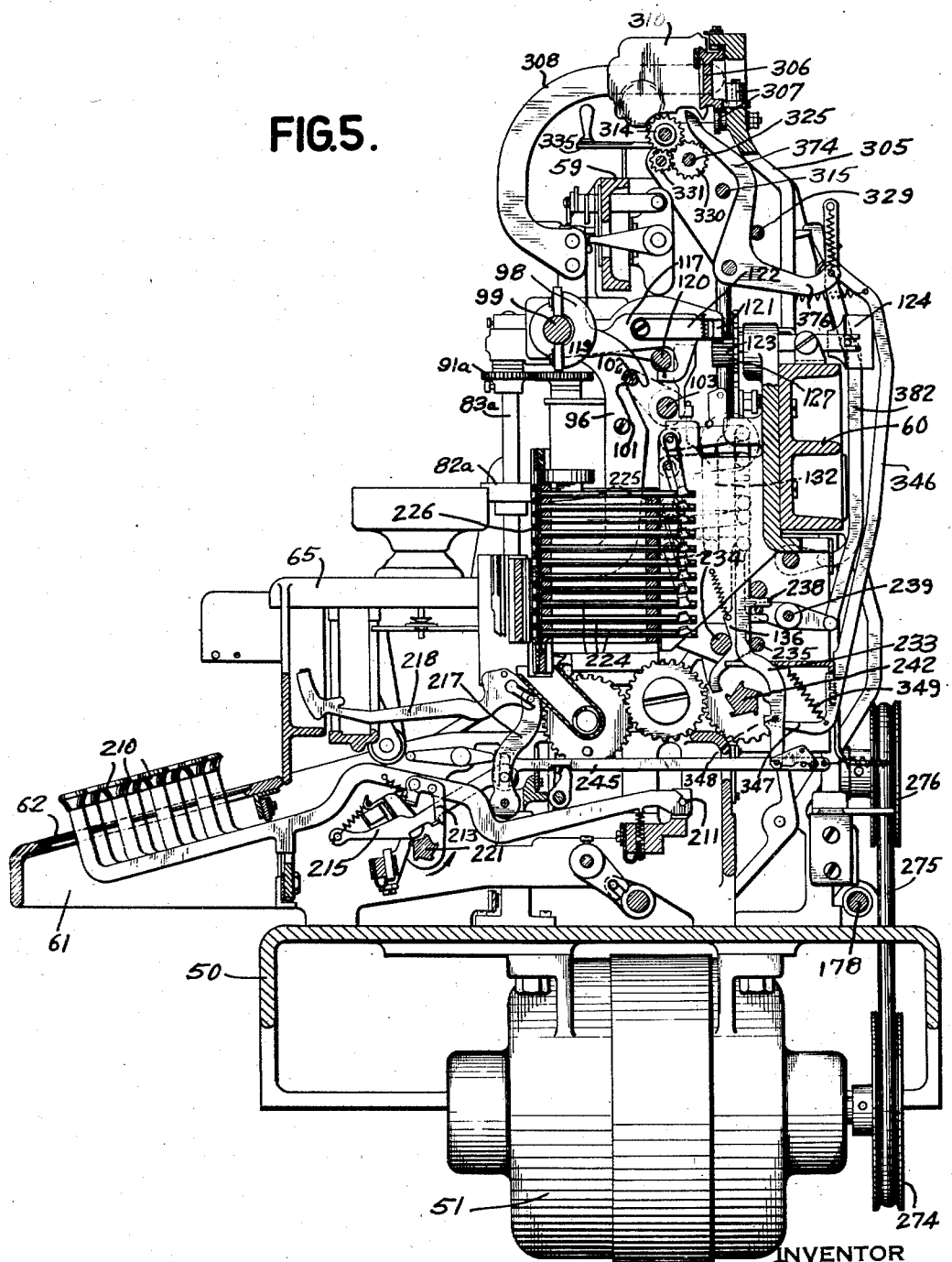
Figure 5 is a vertical section taken approximately on the line 5—5 of Figure 2.

The usual rack bar 121 for letter feeding movement is provided and is shown in Figure 5 as being attached to arms 122 pivotally mounted in the frames 117. The arms 122 and rack bar 121 are spring urged downwardly, as is usually the case in such mechanisms, to keep the teeth of the rack bar in constant meshing relation with the usual letter feeding pinion 123. The rack bar may be disengaged from the pinion by rocking a governor 124 about its pivotal connections to the frame 60 until the teeth in the rack bar clear the teeth in the pinion. The rocking of the governor in this fashion is controlled by a tabular stop key 125 (Figure 1).

*Escapement mechanism*

The pinion 123 is pivotally mounted upon a screw stud 126 carried by the frame 60 and is controlled by a letter feeding ratchet 127 (Figure 11) mounted on said stud and provided with spring-urged dogs 128 engaging the teeth of pinion 123. A plate 129 is journalled on pivots 130 carried by the framework of the machine and has an arm 131 (Figure 12) extending to the rear by means of which the plate can be rocked by an upwardly extending link 132 which has a notch engaging a stud 133 in the end of arm 131. A spring 134 attached to the stud 133 and to the framework normally holds the plate in an upright position. The link 132 is pivoted to one arm of a bail 135 the other arm of which has pivoted thereto a downwardly extending link 136 which, on each operation of a numeral or space key, is first drawn downwardly by the fluted punch actuator and then returned by a spring, assisted during the initial part of the return movement by the fluted punch actuator. This down and up motion of the link 136 causes the carriage to escape the space of one card column in a manner now to be described. The detailed operation of the link 136 by its restoring springs and the fluted punch actuator will be explained later.

Pivoted in the front of plate 129 (Figure 11) is a spring pressed dog 139 which has a tooth normally in the path of the teeth in ratchet 127. The back of plate 129 has fixed thereto a second dog 140 having a forwardly bent lug just out of the path of the teeth of ratchet 127 and slightly to the right (Figure 11) of the tooth in the dog 139. When the parts are in normal position with the carriage at rest, the dog 139 is pressed against a stud 141 fixed in the plate 129 with the spring attached to the dog under tension owing to the tendency of the carriage feeding spring drum 114 to draw the carriage 98 to the left, the spring actuating said drum being considerably stronger than the spring actuating the dog 139 with the consequence that the pinion 123 and ratchet 127 force the dog 139 about its pivot and against the stud 141 in the plate 129.

When the link 136 is drawn downwardly owing to the operation of the space key or a numeral key, the link 132 is likewise drawn downwardly thereby rocking plate 129 forwardly (Figure 11), or to the left as in Figure 12, thereby withdrawing the tooth in dog 139 from engagement with the tooth of ratchet 127 and at the same time bringing the lug in dog 140 into the path of the same tooth in ratchet 127. As a consequence the dog 139 will be released and will rock to the left (Figure 11) against a second stop 142 fixed on plate 129 to bring its tooth just out of the path of the next succeeding tooth in ratchet 127 while the lug in dog 140 will prevent all but an infinitesimal movement of ratchet 127 owing to the close spacing of the tooth in dog 139 and the lug in dog 140 which is just sufficient to permit the lug in dog 140 to move in front of the tooth in ratchet 127 before the tooth in dog 139 becomes fully disengaged from the tooth in ratchet 127.

On the upward stroke of link 136 the plate 129 will be rocked back to its normal position and, during this movement of plate 129, the tooth in dog 139 will be moved into the path of the next succeeding tooth in ratchet 127 before the lug in dog 140 becomes fully disengaged from the particular tooth in ratchet 127 which the dog 131 formerly engaged. As the plate 129 arrives in its home position the ratchet 127 will be freed from the lug in dog 140 and will turn owing to the tension of the carriage feeding spring drum and the next succeeding tooth in said ratchet will catch the tooth in dog 139 and force said dog against the stud 141 thereby permitting the carriage to move one letter space. A spring urged non-return pawl 143 pivoted in the framework prevents rebound or back-lash of the ratchet 127 when it forces the dog 139 against the stud 141.

*Carriage return mechanism*

The carriage is returned by power controlled by means of either the carriage return key 144 or the ejector key 81 (Figures 1 and 2). The mechanism for returning the carriage as controlled by the carriage return key 144 will now be described. Attached to the right end of the carriage (Figure 6) is a tape 145 which passes over pulleys 146 (Figures 4 and 6) and is wound around a carriage return drum 147 (Figures 4, 13 and 18 to 21) adapted to be driven by one of the continuously turning shafts in the machine. The drum 147 is arranged to be driven during carriage returning movements by a pulley 148 (Figures 18 and 19) driven in turn by a belt 149 and pulley 150 (Figure 4) rigidly mounted upon a shaft 151 which is constantly turning under the power of the motor 51.

The mechanism for connecting the drum 147 to the pulley 148 comprises differential gearing controlled by the carriage return key 144. Integral with the drum 147 (Figures 18, 19 and 21) is a gear 152 which in turn meshes with one of a pair of intermeshing pinions 153 rotatably mounted on studs carried by the pulley 148. The other pinion of the pair 153 meshes with a gear 154 rigidly connected to a ratchet wheel 155. The drum 147, pulley 148, and ratchet wheel 155 are all loosely mounted on a stud 156 carried by the framework so it will be obvious that ordinarily the pulley 148 will merely turn idly without driving the drum 147 as long as the ratchet wheel 155 is free to turn.

A short shaft journalled in the framework adjacent the key lever of the carriage return key has an arm 144a provided with a bent over lug underlying said key and a second spring urged arm having a hooked portion 157 engaging one arm of a three-armed lever 158 which is pivoted to said framework and is spring-urged clockwise (Figure 21) to engage said hooked portion 157. One arm of the lever 158 has a hooked portion 159 adapted to engage the teeth in ratchet 155 and prevent the latter from turning but is normally held out of the path of said teeth by the hooked portion 157.

When the carriage return key is depressed the forward end of arm 144a is depressed thereby raising the hooked portion 157 out of engagement with the arm on lever 158 and permitting the latter to rock clockwise to bring the hooked portion 159 into the path of the teeth in ratchet 155. Ratchet 155 is thus prevented from turning in consequence of which the pulley 148 will drive the drum 147 to wind up the tape 145 and return the carriage.

The left frame 117 of the carriage 98 carries a bent lug 160 which engages a bent over lug 161 in the upper end of a vertically movable slide 162 (Figures 17 and 21) when the carriage arrives at its extreme right hand position (Figure 1) and raises said slide. A pin 163 in the lower end of said slide underlies the hooked portion 159 in the three-armed latch lever 158 and, when the slide 162 is raised as described, lifts said hooked portion out of engagement with the teeth of ratchet 155 thereby preventing the drum 147 from further winding the tape 145 after the carriage has arrived at the end of its returning movement and also latches up the three arm lever 158.

*Back spacing mechanism*

The back space key 164 (Figs. 2 and 20) may be operated to feed the carriage backwardly one column or letter space and controls mechanism for causing the carriage return drum 147 to wind the tape 145 a distance sufficient to effect such backward movement of the carriage. Journalled on the stud 156 (Figure 20) is a slotted arm 166, the slot of which embraces a stud carried by one arm of a double-armed lever 167 rotatably mounted on a stud 168 in a bracket fixed to the framework. The arm 166 also carries a pivoted spring-urged pawl 169 adapted to engage the teeth of a ratchet wheel 170 fast to the side of drum 147 but is normally held out of contact with said teeth by a pin 171 fixed in the framework. The other arm of the double armed lever 167 carries a spring urged driving pawl 172 adapted to engage the teeth of a driving ratchet 173 fixed to the side of a gear 174 which is loosely mounted on stud 168 and in mesh with a gear 175 fixed to the pulley 148. It is clear that gear 174 and driving ratchet 173 will be constantly driven by the pulley 148.

The driving pawl 172 is normally held away from the ratchet 173 by a bent over lug on an arm 176 fixed to a tube 177 loose on a cross shaft 178. The other end of the tube 177 has fixed thereto an arm 179 having a pin and slot connection to a rock lever 180 pivoted in the framework and carrying at its forward end a spring urged non-repeat pawl 181. The key lever of the back space key 164 carries a block 182 normally engaging a notch in the free end of the pawl 181.

When the back space key 164 is depressed the pawl 181 and rock lever 180 are depressed thereby rocking arm 179, sleeve 177, and arm 176 clockwise (Figure 20) to disengage the lug in arm 176 from the tail of the pawl 172 thereby permitting the latter to move under the influence of its spring into engagement with the teeth in ratchet 173. As a consequence the constantly driven ratchet 173 drives the double-armed lever 167 counter-clockwise thereby rocking the slotted arm 166 downwardly to force the pawl 169 into engagement with the teeth of ratchet 170 and effect a slight clockwise rotation of ratchet 170. This results in drawing the tape 145 downwardly a distance sufficient to move the carriage back one column space. When the tail of pawl 172 arrives at its home position said tail strikes the lug in arm 176 and is disengaged from the ratchet 173, a spring-urged back lash pawl 183 preventing rebound of the pawl 172. The non-repeat pawl 181 is disengaged from the block 182 near the end of the downward stroke of the key 164 by a fixed pin which construction prevents repeated back spacing operations if the key 164 is held down too long and also permits the arm 176 to be restored by a spring before the key 164 is released.

*Ejector key mechanism*

The ejector key 81 is depressed after the last column of the card has been perforated and it is desired to feed a new blank card into position to be perforated and printed. The depression of the ejector key 81 sets in motion the mechanism for ejecting from the machine the card already perforated, effects return of the carriage, and, finally, effects feeding of a new blank card into the machine, these movements being performed sequentially under control of the cams on shaft 80 and certain auxiliary safety devices.

The key lever of the ejector key carries a block 184 (Figure 13) engaging a non-repeat pawl 185 pivoted on an arm 186 fixed to a cross shaft 187. A short arm 188, also fixed to shaft 187 has a pin engaging an arm 189 fixed to another cross shaft 190 extending to the left of the machine and in front of the right end of cam shaft 80. A spring 191 attached to a pin on arm 189 and the pin on arm 188 holds arm 189 against the latter pin so that both shafts 187, 190 will be rocked together when the ejector key 81 is depressed, provided there is no restraint imposed on shaft 190. The left end of shaft 190 carries an arm 192 (see Figure 13 also) having a lug holding a spring-urged driving pawl 193 carried by an arm 193a fixed to shaft 80 (Figures 13 and 15) out of cooperative relation with the teeth of a driving ratchet 194 fixed to a gear 195, both the gear and the ratchet being journalled on a fixed stud coaxial with shaft 80. The gear 195 is constantly driven by a gear 196 fixed to a shaft 197 which in turn is driven by the motor 51 through connections described later.

When the ejector key is depressed the arm 192 will be rocked down to release pawl 193 whereupon the ratchet 194 will drive the arm on shaft 80 and said shaft through one complete revolution. During the first part of the cycle of revolution of shaft 80 the cam 106 effects rearward movement of arms 96, 97 to permit free passage of the card therebetween into the magazine 56. Thereafter the rollers 82a, 88a will be brought together to feed the perforated card into the storage magazine 56 as described after which a pin 198 on cam 107 will engage an arm 199 fixed to shaft 178 and rock said shaft clockwise (Figure 21). An elbow lever 200 fixed to shaft 178 will thus be rocked clockwise by shaft 178 against the tension of a spring to lift the end of the arm having the hooked portion 157 through the medium of a pin 201 in the free end of said lever 200. As a result the hooked portion 159 of three arm lever 158 engages the teeth in ratchet 155 and a carriage return movement is effected exactly as if the carriage return key 144 had been depressed.

Toward the end of the card feeding and ejecting cycle the cam 106 (Fig. 3) moves arm 96 (Fig. 4) into the path of the blank card fed from the magazine 55 by the picker mechanism and feeding rollers 82, 88, as described before.

It might happen that the carriage will not be moved completely to the left and, as an operation of the ejector key under such circumstance might cause damage, mechanism has been provided to prevent a depression of the ejector key from taking effect until the carriage has been moved its full distance to the left, such movement of the carriage being effected either by means of the space key 137 or the tabular stop key 125.

Fixed to the shaft 190 (Figures 13 and 14) is an arm 202 abutting the forward end of a lever 203 pivoted at its midpoint to the framework. A link 204, pivoted to the rear end of lever 203, is pivoted to the lower end of a vertically extending arm 205 pivoted to the frame 58 at 206. The arm 205 (Figure 16) forms part of a bail which has a resilient connection to a second arm 207 also pivoted at 206 which arm extends upwardly to the left of an opening in frame 58. The left end of the rack 121 is adapted to pass through said opening when the carriage is in its extreme left hand position and rock both arms 205, 207 as one thereby pushing link 204 to the right and rocking lever 203 to remove the end of said lever from obstructing relation with the arm 202. The ejector key 81 may now be depressed to initiate a card feeding and ejecting cycle.

Should the ejector key be depressed before the carriage has reached its extreme leftward limit of travel the arm 202 will be stopped by the end of lever 203 and the spring 191 will be stretched. At the same time a rearwardly extending arm 208 (Figures 13 and 14) fixed to shaft 187 will be raised by the depression of the ejector key 81 and a bent over lug formed in a spring-urged latch arm 209 loose on shaft 178 will snap under the end of arm 208 thereby holding the arm 186 in depressed position with spring 191 under tension as in Figure 14. Latch arm 209 has a pin and slot connection with shaft 178 so that subsequent rocking of shaft 178 clockwise as described to effect a carriage return movement will rock said latch out of engagement with the end of arm 208 permitting the restoring of said arm and arm 186 to normal position.

Before the last named events can take place the carriage must be moved to the left by using the tabular stop key 125 or the space key 137. When the card carriage 98 reaches its leftward limit of travel the arms 205, 207 will be rocked by the rack 121 as described to release the arm 202 whereupon the spring 191 will rock arm 189 and shaft 190 to release the pawl 193 thereby initiating a card feeding and ejecting cycle as described before.

Typewriter action

The operation of the typebars to print is controlled by a series of twelve numeral keys 210 on the key board 62, corresponding to the twelve index-point positions in the card. The key levers of keys 210 are pivoted at 211 (Figures 5, 9 and 11) to the frame of the machine and normally held up by a spring 212. Each key lever carries a spring-urged non-repeat pawl 213 pivoted thereto at 214 and having a notch in the free end in which rests a bent over lug of an actuator 215. There is an actuator 215 associated with each numeral key lever and each actuator is pivoted at 216 to a type bar actuator 217 having a pin extending into a cam slot in the associated typebar 218. Springs 219 attached to the free ends of the actuators 215 normally hold the bent over lugs in the actuators in the notches in pawls 213. Each actuator has a projection 220 just out of the path of movement of the edges of the flutes in a fluted driver 221. The latter is driven at a constant speed in the direction of the arrows in Figures 5, 9 and 10 and also serves as a coupling between shafts 85, 85a hereinbefore mentioned. The "12" key has no type on the type bar 218a (Figure 10) associated therewith since a "12" is never printed.

Depression of any of the keys 210 causes pawl 213 to depress actuator 215 until the projection 220 therein is engaged by the edge of one of the flutes in the driver 220 and is moved rapidly by the latter downwardly and to the left (Figures 9 and 10) thereby drawing the typebar actuator 217 forwardly or to the left (Figures 9 and 10) and camming the typebar in a clockwise direction in said figures to effect printing of the character on the typebar in the "12" position of the card. Near the end of the stroke of the actuator 215 a cam edge 222 therein strikes a stop 223 which forces the actuator away from the driver 221 until the actuator becomes disengaged from the driver whereupon the spring 219 returns both the actuator 215, the typebar actuator 217, and the typebar 218 or 218a operated, with the lug in the actuator 215 again in the notch in pawl 213.

Should a key 210 be held down too long the lug in actuator 215 will not slip into the notch in pawl 213 but will strike the pawl above the notch and rock said pawl against the tension of its spring. The same actuator cannot again be depressed into cooperative relation with driver 221 until the key has been released permitting its key lever to rise whereupon the pawl 213 will snap over the lug in actuator 215.

Punching mechanism

The punches 224 are eleven in number corresponding to the eleven lowermost index-point positions in the card (Figure 22) and are slidably mounted in vertically extending parallel guides 225 (Figures 9 and 10) disposed in spaced relation in the rear of the punch die 226. The punches are located in approximately the center of the machine behind suitable openings 227, 228 (Figure 6) in the frame 94 and the die plate and forward punch guide 225 are arranged so that the card in said frame will be fed therebetween by the card carriage 98.

The rear ends of the punches 224 (Figures 9, 10 and 11) have slotted connections to arms 229 fast on shafts 230 journalled in frames 231 mounted in the framework. Fixed to each shaft 230 is an arm 232 and pivoted thereto is a vertically hanging punch operating hook 233, the lower end of which slides against a shaft 235, springs 236 normally holding each punch hookup and against the shaft 235. Each operating hook 233 has a rearwardly extending lug 237 overlying a bail 238 fixed to a cross shaft 239 journalled in the framework. Normally the lugs 237 abut short cross shafts 240 fixed in the outer frames 231, being held against said shafts by the springs 236 which are attached to said lugs. The link 136 also has a similar lug 237a underlying the bail 238 and normally a spring 241, which also serves to restore the link 136 after it has been drawn downwardly, holds link 136 up with the lug 237a against the bail 238.

The lower ends of the operating hooks 233 are bent around one side of a fluted driver 242 (Figures 9 and 10) while the lower end of link 136 is formed as a hook and extends on the other side of driver 242 just out of the path of the edges of the flutes. Each operating hook has a projection 243 adapted to be caught by the edges of the flutes in driver 242 when the lower end of said hook is moved to the left (Figures 9 and 10) and each also has a cam projection 243a adapted to cooperate with a cross shaft 244.

The mechanism for selectively connecting the punches to the driver 242 for operation by the latter comprises a series of slides 245 (Figures 8 to 11) which are slidably mounted in combs 246 mounted in the framework and having at their forward ends slotted hooks 247 embracing the pins 216 by which the actuators 215 are pivoted to the typebar actuators 217, each slide being normally drawn to the rear of the machine by a spring 248. Each slide has pivoted thereto a spring-pressed non-repeat pawl 249 having a shoulder or notch engaging a pin 250 on the lower end of the corresponding punch operating hook 233.

Whenever a numeral key 210 is depressed the actuator 215 will be operated as already described to effect the printing impression from the corresponding typebar and at the same time the associated slide 245 will be drawn forwardly owing to the forward motion of the typebar actuator 217 and, as a consequence of the non-repeat pawl 249 engaging the pin 250 in the end of the associated punch operating hook 233, the lower end of the latter will be swung to the left (Figure 9) and the projection 243 will be carried into co-operative relation with the edge of a flute in driver 242. The latter will thus catch projection 243 and draw the punch operating hook 233 downwardly thereby rocking the associated shaft 230 and causing the selected punch to pass through the record card.

Near the end of the downward stroke of the punch operating hook the projection 243a will engage the shaft 244 and will cam the punch operating hook out of engagement with the driver 242. During the down stroke of the punch operating hook 233 the lug 237 in said hook will rock bail 238 and shaft 239 and, as a consequence, the bail 238 through lug 237a will force the link 136 downwardly.

Said link 136 has a cam edge 251 (Figures 9, 10 and 29) which, on the down stroke of said link, will force the hook portion in said link into co-operative relation with the edge of a flute in the driver 242, this action occurring at about the time the punch operating hook 233 is disengaged from driver 242 by the action of lug 243a. The link 136 is normally restored by the spring 241, but, owing to the fact that a punch penetrated the card prior to the time the link 136 should start its upward movement, there may be a tendency for the punch operating hook 233 to stick in its lowermost position. This action is positively prevented by the driving action between the hook portion of link 136 and the fluted driver 242, which forces the link 136 upwardly a short distance until the operated punch is withdrawn from the hole in the card. After link 136 has been fairly started on its upward movement by this positive drive, the link is cammed clear of the driver (by cam surfaces like 251 cooperating with the shafts 234, 235) and its restoration, during the final portion of its movement, is effected by the restoring spring 241. The upward movement of link 136 by spring 241 assists the spring 236 in restoring the punch operating hook and at the same time operates the carriage escapement mechanism as previously described.

If it should happen that slide 245 fails to return to its normal rearward position before the punch operating hook 233 arrives in its home position, the pin 250 in the lower end of said hook will not slip into the notch in the non-repeat pawl 249 but will engage the said pawl in the rear of the notch therein and will rock the pawl against the tension of its spring. Thus the hook operated cannot be again thrown into cooperative relation with the driver 242 until the slide 245 has fully returned to its home position at which point the pin 250 will drop into the notch in the non-repeat pawl 249.

The rocking of shaft 239 is utilized to operate the ribbon feeding mechanism through the medium of an arm 252 fixed to said shaft to which is pivoted a link 253 (Figure 11). The ribbon feeding and reversing mechanism may be of any desired form such as the one illustrated in Patent No. 1,867,025 already mentioned. Since said ribbon feeding and reversing mechanism is not directly involved in the present invention it will not be described herein.

As was remarked before, the "12" key does not have any corresponding punch but controls the punch corresponding to the "11" key. The slide 245a associated with the "12" key (Figure 10) does not have any corresponding non-repeat pawl 249 but carries a pin 254 projecting through a slot in the slide 245 associated with the "11" key. It will be obvious that when the "12" key is depressed the pin 254 will push the slide 245 of the "11" key forwardly as if the "11" key had been depressed consequently the punch operating hook 233 associated with the "11" key will be drawn into cooperative relation with the driver 242. Before this actually takes place, mechanism controlled by the "12" key, which will now be described, lowers the card guiding frame 94 so that the "11" punch will perforate in the "12" index-point position instead of in the "11" index-point position.

*Operation of the card guiding frame*

Figure 6:
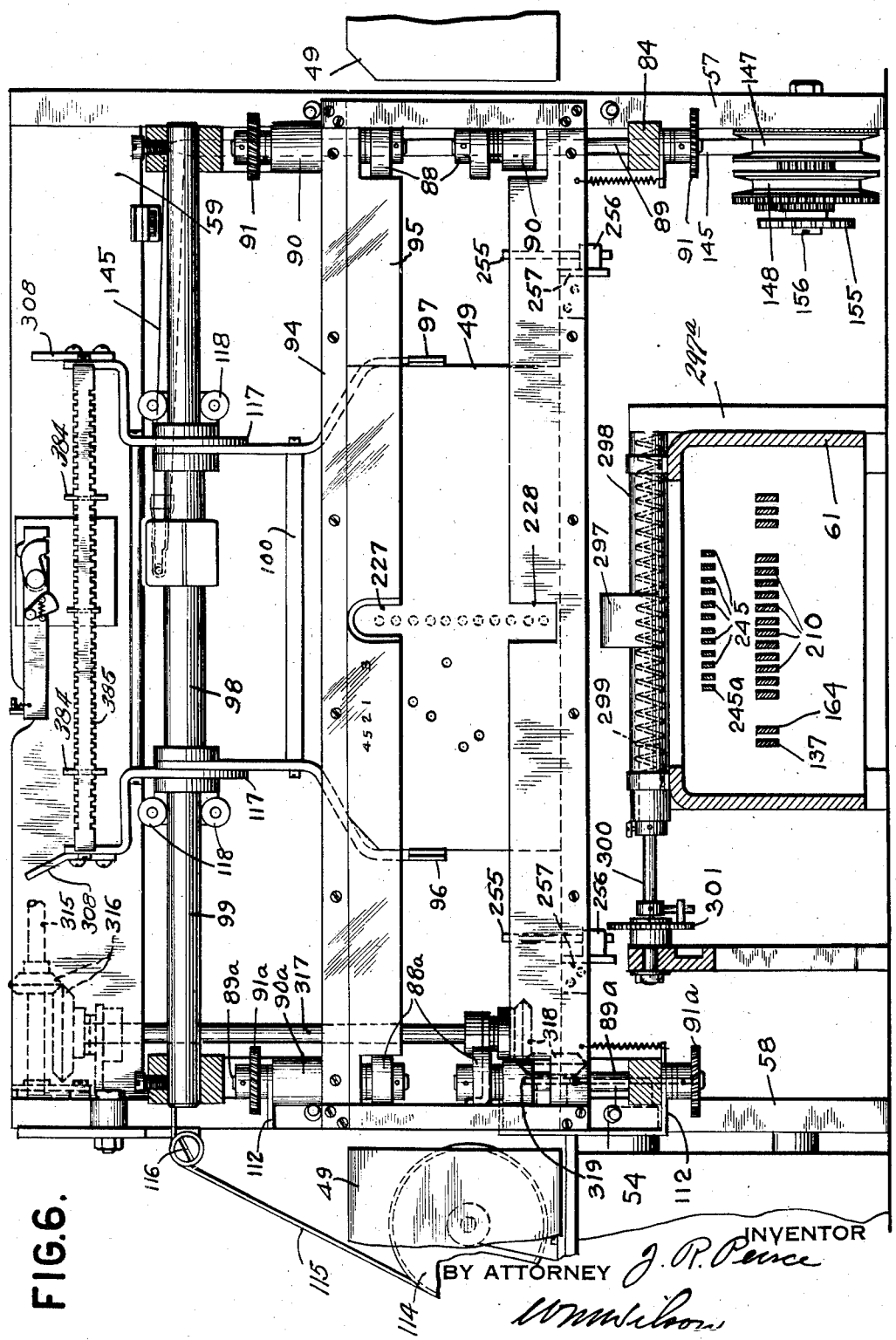
Figure 6 is a front elevation of the card carriage and card guiding and feeding mechanism.
Figure 10:
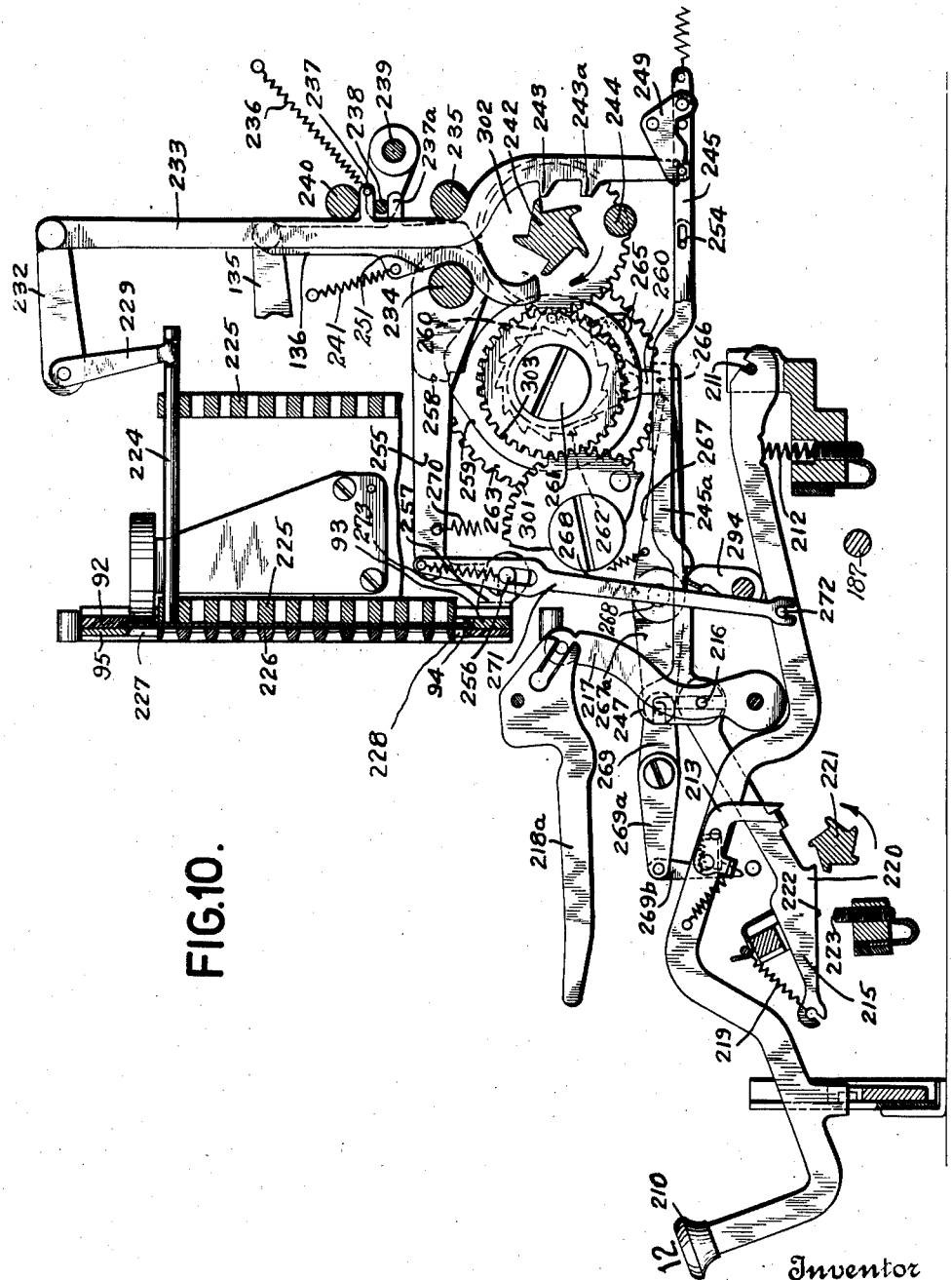
Figure 10 is a vertical section illustrating the mechanism controlled by the "12" key.
Figure 25:
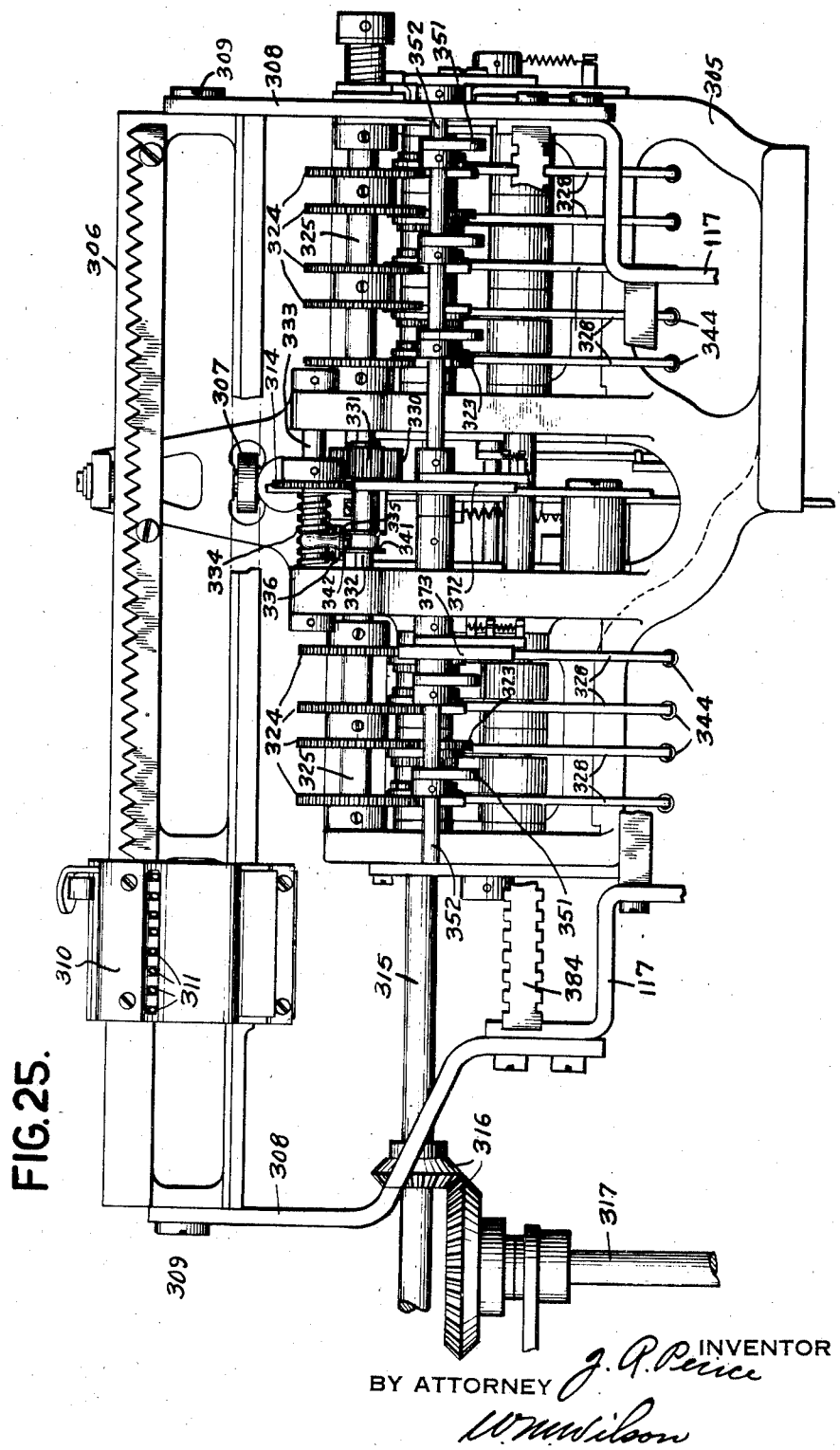
Figure 25 is a front view of the amount entering mechanism, the totalizer truck, and a totalizer.

The card guiding frame 94, as was pointed out before, is vertically movable a distance equal to that between two successive index-point positions in a card column and is capable of being lowered when it is desired to punch in the "12" index-point position. Fixed on the shaft 234 is a pair of arms 255 extending forwardly just in back of the card guiding frame 94 and provided with slots embracing pins 256 attached to brackets 257 fixed to the rear side of member 93 of said frame (Figures 6 and 10). Also fixed to the shaft 234 is an arm 258 which projects forwardly or to the left (Figure 10) and normally rests upon a tooth formed on a cam 259. The cam 259 is fast to an arm 260 journalled upon a stud 261. Also journalled on said stud 261 is a ratchet 262 connected by a sleeve to a gear 263 (see Figure 7 also) meshing with a gear 264. Pivoted on the arm 260 is a spring-pressed driving pawl 265 having a tail engaging a hook portion 266 formed in the end of an arm 267 fixed to a rock shaft 268 journalled in the frame of the machine and said arm 267 is spring-urged upwardly into contact with the tail of said pawl.

Normally the hook portion 266 holds the driving pawl 265 with a tooth in the end thereof out of engagement with the teeth of ratchet 262 so that the ratchet 262 merely turns idly without driving the cam 259. Fixed to the shaft 268 is an arm 267a having a pin and slot connection to an arm 269 rigid with a sleeve journalled on a fixed stud. Also fixed to said sleeve is an arm 269a to which is pivoted a spring-pressed non-repeat pawl 269b having a hook normally engaging a lug in the "12" key lever.

When the "12" key is depressed the lug therein engaging the hook in pawl 269b will draw said pawl downwardly thereby depressing the forward end of lever 269a and raising the forward end of arm 267a as a consequence of which the hook portion 266 in arm 267 will be disengaged from the tail of the driving pawl 265. The driving pawl 265 will then engage the teeth of ratchet 262 so that the cam 259 will commence to turn under the power furnished by the gearing 263, 264.

Just before the non-repeat pawl 249 associated with the "11" key draws the punch operating hook 233 of the "11" punch into engagement with the driver 242 the notch in arm 258 will drop off the tooth on cam 259 thereby permitting the arms 255 to be drawn down by a spring 270 and lowering the card guiding frame 94 so that when the punch 224 associated with the "11" key finally becomes operative a perforation will be made in the "12" index-point position of the card instead of in the "11" index-point position.

In order to prevent a second operation of the "12" key before the punching mechanism and the frame 94 have become fully restored there is provided a link 271 having a pin and slot connection to one of the pins 256 and a forked connection 272 to a pin carried by the "12" key lever. A spring 273 interposed between the pin 256 and a pin in the upper end of link 271 normally holds the pin 256 in the upper end of the slot in said link. When the frame 94 is depressed as described before to effect punching in the "12" index-point position, the link 271 is forced downwardly and the connection 272 to the "12" key lever prevents said key lever from rising until the frame 94 has been restored to its normal uppermost position.

*Driving connections to the motor*

The motor 51 is mounted on the underside of the base 50 as shown in Figs. 3 and 5 and through the medium of a pulley 274 and a belt 275 drives a pulley 276 fixed to a shaft 277 rotatably mounted in a housing 278 (Figures 7 and 15) extending parallel with the left edge of the base 50 of the machine. Mounted on the rear end of said shaft 277 is a worm 279 meshing with a worm wheel 280 fixed to the shaft 197 in consequence of which said shaft 197 is constantly rotated under the power of the motor. Said shaft 197 through a coupling shaft 197a, drives the fluted driver 242 and also drives the shaft 151, which it will be remembered drives the carriage returning and back spacing mechanism.

Fixed to the forward end of the shaft 277 is a second worm 281 meshing with a second worm wheel 282 fixed to shaft 85a. The shaft 85a, it will be recalled, drives feeding rollers 82a and 88a for ejecting the card from the machine and also provides power for the driver 221 and the shaft 85a which in turn drives the feeding rollers 82, 88.

Miscellaneous machine details

The space key 137 is pivoted at 211 and, when depressed, rocks an arm 283 (Figure 8) pivoted on shaft 187, through the medium of a bent-over lug formed on said arm and underlying the key lever of the space key. The arm 283 is fixed to a hub loosely mounted on shaft 187 and secured to a sleeve 284 also loose on said shaft. The other end of the sleeve 284 has secured thereto an arm 285 to which is pivoted the forward end of a slide 245b similar to the slides 245, and arranged to draw a hook 233b similar to the hooks 233 into engagement with the driver 242.

The hook 233b (Figure 11) is pivoted to an arm 232b which is loosely mounted on one of the shafts 230 and similar to the arms 232 (Fig. 9), the hook 233b having lugs 237, 237a similar to the lugs on the other hooks 233. When the space key is depressed the arm 283 will be rocked downwardly thereby drawing arm 285 and link 245b forwardly which results in drawing hook 233b into cooperative relation with the driver 242. The latter will then pull said hook 233b downwardly and, through the medium of lug 237 on said hook, will rock the bail 238 to draw down the link 136, as described before, and thereby cause the carriage to escape one column space.

As is customary in typewriting machines the inked impression ribbon is not normally at the printing line but is is moved to the printing line each time a numeral key is depressed to print. As shown in Figures 23 and 24 the ribbon is carried in a ribbon carrier 286 which is slidably mounted in the rear of a part 287 of the type segment which pivotally supports the type bars in a well-known manner. It will be seen in Figure 23 that the ribbon 288 passes through loops 289 formed in the upper end of the ribbon carrier and arranged so that the ribbon may be easily slipped out of said loops when it is desired to change the ribbon, the ribbon carrier being forked as shown.

The lower end of the ribbon carrier is pivoted to one end of an arm 290 pivoted at 291 to the framework and a link 292 is pivoted to the arm 290 intermediate the ends of said arm and has a pin and slot connection to an arm 293 of a bail 294. The bail 294 is pivotally mounted beneath the slides 245 which it will be recalled effects the connecting of the punches to the driver 242, each slide 245 having a notch 295 which embraces the bail 294. Normally the ribbon carrier 286 is held up by a spring 286a with the ribbon 288 above the printing line. When any numeral key 210 is depressed the associated slide 245 will be drawn forwardly thereby rocking the bail 294 forwardly, depressing arms 293, 290, and drawing down the ribbon carrier 286 so that when the type strikes the ribbon will be at the printing line, this position being shown in Figure 24 with the ribbon in position to print in the "12" index-point position of the record card. The back of the ribbon carrier is formed with a tongue or strip 296 which has a series of tooth-like projections adapted to catch any punchings which may stick to the die of the punches and strip said punchings from the front of the die thereby preventing accumulations of punchings in front of the die.

Since the punchings ejected from the die might clog up the machine by getting in the mechanism, means is provided for removing the punchings and depositing them in a suitable receptacle. Mounted beneath the lower end of the punch die is a chute 297 (Figures 6 and 24) which is adapted to receive the punchings as they drop down from the die. The chute 297 connects with a tube 298 extending crosswise of the machine beneath the card guiding frame 94 and at the left end of said tube a spiral spring 299, which is rotatably mounted in said tube, is connected to a shaft 300 carrying a pin engaging a pin mounted on a gear 301, the gear 301 being pivotally mounted upon a stud coaxial with the shaft 300.

The gear 301 is driven constantly by a gear 302 (Figures 7 and 10) fixed on the coupling shaft 197 through the medium of an idler gear 303 journalled on a stud fixed on the frame 63. It will be seen that the spiral spring 299 will act like a spiral conveyor and will steadily move any punchings which may drop down the chute 297 toward the right into a chute 297a (Figure 6) leading down into a chip receptacle 304 (Figure 1) removably mounted in the base of the machine.

Differential mechanism

The present invention provides mechanism for entering amounts in an accumulator digit-by-digit as the respective digits are punched in and printed upon the record card. This mechanism is shown generally in Figures 1, 2 and 5 and in detail in Figures 25 to 30. Mounted upon frame 60 near the mid-point of the machine (Figure 2) is a frame 305 which supports the differential mechanism and also the rollers guiding the carriage 306 upon which the accumulators are mounted. The carriage 306 is slidably mounted upon guiding rollers 307 (Figure 26) carried by studs mounted in the frame 305 and is adapted to be moved step-by-step from right to left by the card carriage through the medium of arms 308 (Figures 1, 2, 5 and 25) rigidly attached to the side frames 117 of the card carriage, said arms 308 having free pivotal connections at 309 to the carriage 306.

The pivotal connections 309 may be made slightly loose so that the carriage 306 need not be accurately alined with the card carriage while the rollers 307 are accurately located so that the relation between an accumulator wheel and the master wheel, later to be described, will always be maintained constant. Removably mounted upon the carriage 306 is a totalizer 310 of which more than one may be provided as desired, according to the number of fields in the record card which are to be tabulated. The totalizer 310 is of well-known construction and may be of the form illustrated and described in Letters Patent No. 1,270,471 and No. 893,718, granted to John C. Wahl.

Since the construction of the totalizer itself is well-known and forms no part of the present invention it will not be described in detail herein. It will be sufficient to remark that it is composed of a plurality of indicating wheels 311 (Figures 25 and 26) adapted to be rotated by means of gears 312 (see Figure 26) through the medium of idler gears 313, the gears 312, 313 and wheels 311 being rotatably mounted in cross shafts in the frame of the totalizer. The gears 312 are adapted to be brought successively into mesh with a master wheel 314 in a well-known manner as the carriage moves from right to left during the punching and perforating of amounts in columns of the record card. The master wheel 314 is adapted to be rotated differentially either additively or subtractively through mechanism now to be described.

Journalled in the frame 305 is a cross shaft 315 (Figure 25) which is constantly driven by the motor through connections comprising bevel gears 316, a vertical shaft 317 journalled in brackets carried by the frame 58, bevel gears 318, and gears 319 (see Figures 6 and 7), one of which is mounted upon shaft 197 which it will be recalled is driven constantly by the motor 51. Mounted upon the shaft 315 is a series of driving ratchets 320 and associated with each driving ratchet is a member 321 (Figure 26) freely mounted upon the shaft 315 and carrying a driving pawl 322 pivoted at 322a, each pawl 322 having a tooth adapted to cooperate with the teeth in the associated driving ratchet 320 so as to be driven by the latter.

There are as many driving ratchets 320 and members 321 as there are amount keys 210, with the exception of the "0", "11", and "12" keys, and associated with each driving ratchet and member 321 is a mutilated gear 323 (Figure 26) fixed to the corresponding member 321 and having a number of teeth corresponding to the value of the key with which said driving ratchet is associated. The teeth in mutilated gears 323 are adapted to mesh with gears 324 fixed to a cross shaft 325 journalled in the frame 305. Normally the driving pawls 322 associated with respective members 321 are all spring-urged into engagement with the associated driving ratchets 320 but are prevented from actually engaging the teeth of said ratchets owing to a tail 326 in said pawls being engaged by a hook portion 327 in a member 328 journalled upon a shaft 329 carried by the frame 305 so that the driving ratchets 320 merely rotate idly without driving their associated mutilated gears 323. The members 328 are adapted to be rocked about the shaft 329 under control of the keys to release the driving pawls 322 and permit said pawls to engage the teeth in the driving ratchets 320 so that the mutilated gear 323 associated with any member 321 of which the driving pawl has been released will be coupled to shaft 315 and be driven by the latter so as to rotate the corresponding gear 324 a distance depending upon the number of teeth in the mutilated gear. This movement of gear 324 is communicated to the master wheel 314 so as to rotate the latter a corresponding amount through connections now to be described.

Splined to the shaft 325 is a gear 330 (Figure 27) in constant mesh with a pinion 331 fixed to a sleeve rotatably mounted on a shaft 332 (Figure 26) journalled in the frame 305. The master wheel 314 is rigidly mounted on a shaft 333 journalled in the frame 305 above and parallel with the shaft 332 and restrained from axial movement by suitable collars. In order to prevent accidental movement of the master wheel 314 due to jarring of the machine or momentum there is interposed a spring 334 (Figure 27) between the frame 305 and the master wheel 314, this spring acting as a brake which has sufficient friction to permit the master wheel to be turned freely by either the gear 331 or the gear 330 according to whichever of said gears is in mesh with the master wheel.

The gears 330, 331 are adapted to be shifted alternatively into mesh with the master wheel 314 by means of a lever 335 pivoted at 336 to a bracket 337 fixed in the frame 305. The gear 330 is provided with a sleeve 338 having a groove 339 into which projects an anti-friction roller 340 carried by a pin on the arm 335. The sleeve in which the pinion 331 is attached likewise has a groove 341 into which projects an anti-friction roller 342 carried by member 335. The anti-friction rollers 340, 342 are located on opposite sides of the pivot 336 of the member 335. Mounted upon frame 59 adjacent the member 335 is a notched plate 343 having three notches therein adapted to receive the member 335 and hold said member in any one of three positions which may be referred to as "add", "non-add", and "subtract" positions, the central position being the non-add position.

When the member 335 is in the central position, neither the gear 330 nor the pinion 331 is in mesh with the master wheel 314, however, when the member 335 is shifted to the right (Figure 2), or downwardly (Figure 27), the gear 330 will be thrown into mesh with the master wheel 314 and said master wheel will be rotated in a direction to add in the accumulator 310. On the other hand, if the member 335 be positioned in the upper notch in Figure 27, the pinion 331 will be thrown into mesh with the master wheel 314 and, since said pinion is still in mesh with gear 330, the gear 330 will drive said pinion and through the latter will drive the master wheel 314 in the opposite direction to that in which the gear 330 drives the master wheel when in direct meshing relation with the latter. It will thus be seen that the master wheel 314 may be rotated additively or subtractively or not at all according to the will of the operator.

The members 328 (Figure 26) which hold the driving pawls 322 out of cooperative relation with the teeth in driving ratchets 320 comprise three-armed levers pivoted upon the shaft 329 as aforesaid. Normally a spring 344 holds said members 328 in the position shown in Figure 26 with projections on said members abutting part of the frame 305. Each member 328 has a rearwardly extending arm 345 on the free end of which normally rests the hooked end of a link 346 which carries a pin to which the spring 344 is connected. The links 346 are guided by suitable combs and extend downwardly in the rear of the machine and are adapted to be operated by the punch operating hooks 233 when said hooks are drawn downwardly after being selectively connected to the driver 242.

As shown in Figure 5, each of said links 346 has a forwardly extending hook portion 347 the end of which underlies a pin 348 carried by the associated punch operating hook 233 and each is held in the position shown in Figure 5 by means of a spring 349 interposed between a fixed part of the framework and the lower end of each link.

It will be seen that whenever a punch operating hook 233 is drawn downwardly by the driver 242 the corresponding link 346 will be likewise drawn downwardly and will rock the member 328 associated therewith in a clockwise direction (Figure 26) until the hook portion 327 becomes disengaged from the tail of the corresponding driving pawl 322 thereby permitting the said driving pawl to be drawn by its spring into cooperative relation with the teeth in the associated driving ratchet 320 which will then drive the member 321 in a counterclockwise direction for one complete revolution during which time the teeth in the mutilated gear 323 will cause the master wheel to rotate an amount proportional to the value of the key 210 depressed.

Before the member 321 arrives in its home position the punch operating hook 233 which was drawn downwardly will be released and returned positively as described hereinbefore thereby permitting the member 328 to be drawn by the spring 344 back to its normal position with the consequence that the tail 326 of the driving pawl 322 will again be engaged by the hook portion 327 on the member 328 and will be rocked out of cooperative relation with the teeth of the driving ratchet. Pivoted on each of the members 328 is a spring-pressed pawl 350 which snaps behind the tail 326 of the pawl 322 when said pawl arrives at its home position and prevents rebounding or back lash of said pawl after it strikes the hook portion 327.

Figure 26:
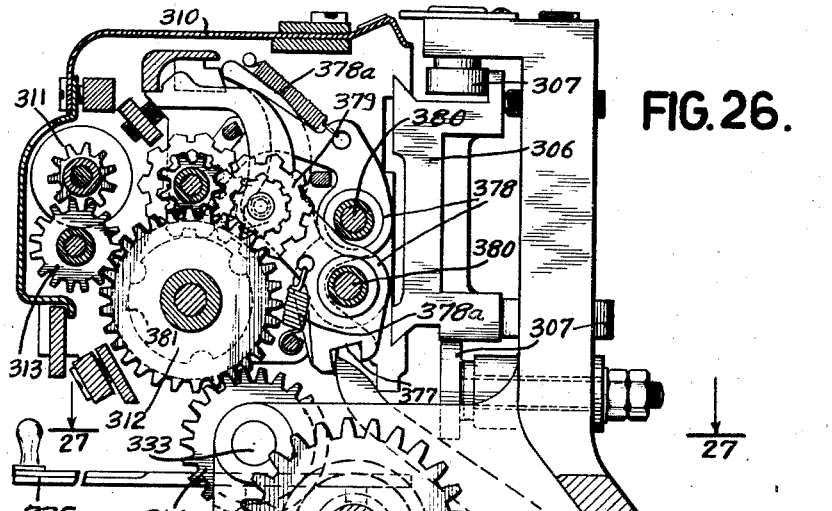
Figure 26 is a vertical section through the amount entering mechanism and a totalizer.
Figure 28:
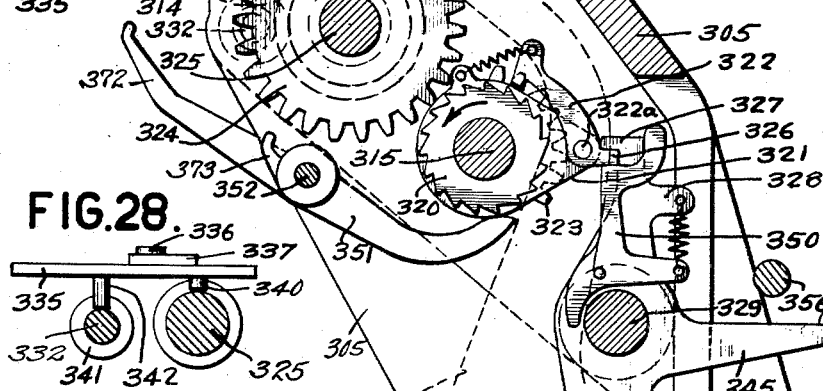
Figure 28 is a detail view in vertical section of certain parts of the mechanism shown in Figure 27.
Figure 27:
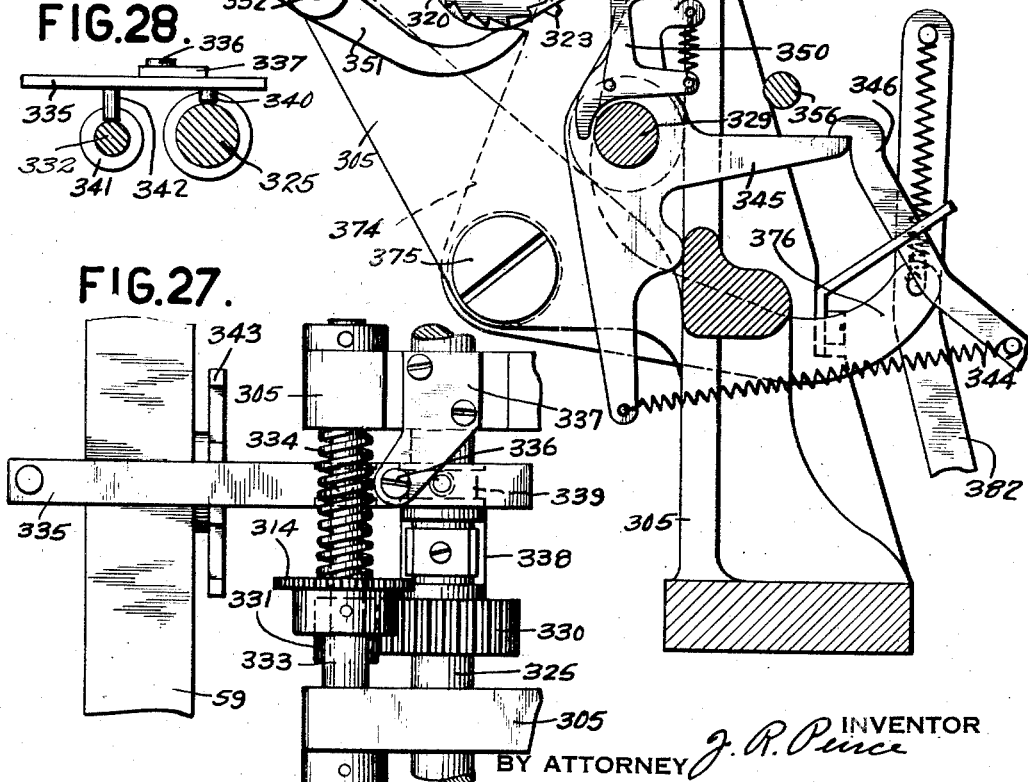
Figure 27 is a plan view of the device for controlling addition, subtraction, and non-add operations of the amount entering mechanism.

It has been found that the punching operation occurs very quickly and is usually completed before the mutilated gears 323 associated with certain keys, like the "9" key for instance, can complete their cycle of operations and, in order to insure that the adding of such digits in accumulator 310 shall be complete, mechanism is provided to prevent escaping of the carriage until the mutilated gears associated with such digits have had time to complete their cycle of operation. This mechanism is best shown in Figures 26 and 29 and is operated by means of arms 351 (see Figure 26) fixed to a shaft 352 journalled in the frame 305. The arms 351 extend rearwardly to one side of the members 321 and lie in the path of movement of the pivot pins 322a for the pawls 322 so that when the gears 323 have become disengaged from the gears 324 the pivot pin 322a of the member 321 operated will strike the end of the arm 351 and rock said arm and shaft 352 in a clockwise direction (Figure 26).

At its right hand end (see Figure 29) the shaft 352 carries an arm 353 extending rearwardly and adapted to engage a rock lever 354 pivoted on a stud carried by the frame 305, the other end of said rock lever 354 engaging an arm 355 fixed to a shaft 356 which shaft—is urged in a clockwise direction by means of a spring and journalled in a bracket carried by the frame 305. The shaft 356 carries an arm 357 adapted to engage a pin in the upper end of a rock lever 358 pivotally mounted on a stud carried by the framework. The lower end of the rock lever 358 is provided with a hook portion 359 adapted to snap over the free end of an arm 360 fixed to the shaft 239, which it will be recalled is rocked in a counterclockwise direction each time a punch hook 233 is drawn downwardly.

Whenever any of the numeral keys 210 are depressed, one of the punch operating hooks 233 will be drawn downwardly in a manner before described, to operate the associated punch and at the same time the bail 238 and shaft 239 will be rocked in a counterclockwise direction, thereby raising the arm 360 and causing the lower end of the rock lever 358 to snap over the end of arm 360 under the influence of spring 361, interposed between the lower end of rock lever 358 and a fixed part of the frame.

The relation of the parts 359, 360 is such that during the time the fluted driver 242 may be forcing the member 136 upwardly to assist the springs 236, 241 in restoring the operated punch hook 233, the arm 360 moves downwardly a short distance before it actually strikes the hook 359 and is arrested by contact with the latter. The shape of the cam 251 on member 136 is such that the latter will be completely withdrawn from the path of the edges of the flutes in driver 242 just before the arm 360 strikes the hook portion 359. Thus, at the time the last named action occurs, the members 136, 233 are both free of the driver 242 and the member 233 will be drawn back to its initial position by its spring 236 while the engagement of arm 360 with the hook portion 359 prevents the member 136 from being drawn farther upwardly. It will be clear, therefore, that the escapement mechanism will not be fully operated and the carriage will remain stationary for the time being. Eventually the pin 322a of the operated member 321 will strike the associated arm 351 and rock the shaft 352 in a clockwise direction (Figures 26 and 29) depressing arm 353, thereby rocking lever 354 in a counter-clockwise direction, arms 355, 357 in a clockwise direction, and lever 358 in a counterclockwise direction to release the arm 360 and permit the spring 241 to finish restoring the member 136 to its initial position. When the member 136 moves to its home position obviously the plate 129 will be likewise moved to home position carrying the dog 140 out of engagement with ratchet 127 and permitting the carriage to escape one column space as described before herein.

Since the "0", "11", and "12" keys and the space key do not control accumulating it is desirable that the mechanism just described be rendered ineffective when one of said keys is depressed. For this purpose the punch hook 233 associated with the "11" key and the punch hook associated with "0" key are provided with pins 362 and 363 which overlie arms 364, 365 carried by sleeves 366, 367, respectively, loosely mounted on a shaft 368 carried by the framework. The sleeve 366 has an arm 369 provided with a bent-over lug engaging one arm of a bell crank 370 fixed to sleeve 367, the other arm of the bell crank 370 being connected by a link 371 to the lower end of rock arm 358 through a pin and slot connection.

The arm of bell crank 370 cooperating with the arm 369 is extended forwardly and underlies a pin 370a on the punch operating hook associated with the space key 137. It follows that whenever punch hooks 233, 233b associated with either the "11" key, or the "0" key, or the space key are drawn downwardly either the arm 364 or the arm 365 will be rocked by the engagement of the corresponding pin on the punch hooks with one of these arms and, as a result, sleeves 366, 367 and the bell crank 370 will be rocked in a counter-clockwise direction thereby forcing the link 371 rearwardly and carrying the hook portion 359 out of the path of movement of the arm 360 so that when the arm 360 rocks upwardly due to the counterclockwise rocking of the bail 238, hook portion 359 will not latch the end of arm 360 and the bail 238 will not be held in rocked position but will be restored immediately by the member 136 when said member is thrown into engagement with the driver 242.

It is desirable that means be provided for preventing erroneous operation of the machine due to overthrowing of certain of the parts as a consequence of their momentum. Mounted upon the shaft 352 is an arm 372 (Figures 26 and 29) which is not rigidly mounted on said shaft but has a yielding connection thereto so as to permit said arm to yield if obstructed. When the shaft 352 is rocked to disengage the hook 359 from the arm 360 the arm 372 is rocked inwardly toward the master wheel to bring a toothed portion formed in the end of said arm between the teeth in the master wheel thereby preventing the master wheel from spinning after a mutilated gear 323 has become disengaged from the associated gear 324 thereby effectively stopping said master wheel and preventing it from turning more than the desired amount.

A similar arm 373 is also mounted on the shaft 352 and in a like fashion engages the teeth of one of the gears 324 fixed on the shaft 325 when the arm 372 is rocked and positively arrests the shaft 325 after it has turned the required amount. The arm 373 like the arm 372, is resiliently mounted on shaft 372 so that, if it should happen to strike the crest of the tooth instead of an interdental space in the gear, the parts will not jam owing to the arm yielding slightly until the gear has turned a distance sufficient to allow the arm 372 to slip into a tooth space.

The transfer mechanism employed in accumulator 310 is of the well-known Geneva type as described in Patent 1,270,471 already mentioned wherein the transfer elements are operated as a Geneva gear train so that normally all of the gears 312 will be locked against rotation owing to the fact that the Geneva type of gear train is, as a rule, of the non-reversible type. It is necessary therefore, before adding on the wheel of any denominational order of the totalizer can take place, to release the transfer element connecting said wheel with the next lower wheel before the differential mechanism becomes effective to add in the desired field. Accordingly, there is provided a master dog 374 (Figure 26) pivoted at 375 to the frame 305 and having a rearwardly extending arm 376. The master dog 374 extends upwardly in the rear of the master wheel 314 and has a nose adapted to engage notches 377 in the arms 378 supporting the transfer elements 379 of the totalizer. The arms 378 are pivotally mounted on cross shafts 380 carried by the totalizer frame and are normally drawn forwardly by springs 378a to hold the transfer elements 379 in engagement with the gears 312 and locking discs 381 in a well-known manner. The arm 376 has resilient pin and slot connection to a link 382 which extends downwardly and is pivotally connected to an arm 383 (Figure 29) rigidly mounted on shaft 239 which it will be recalled is rocked each time the punch is operated to effect escaping of the carriage.

It is clear from the foregoing that each time a punch is operated the bail 238 and shaft 239 will be rocked counterclockwise raising the link 382 and rocking the master dog in a counterclockwise direction thereby, through the engagement of the upper end of the master dog with the notch 377, rocking the arm 378 between the gear 312 on which adding is to take place and the next lower gear 312 and its locking disc 381 and disengaging the transfer element 379 of said lower gear from locking relation with the locking disc 381 and the higher order gear 312. The gear 312 which is in mesh with the master wheel may now be turned by the differential mechanism a distance proportional to the key depressed and at the end of the punching and adding cycle the link 382 will be drawn downwardly and release the arm 378 thereby permitting said arm to again move forward to bring the transfer element 379 in locking relation with gear 312 and locking disc 381. The patent to Wahl 1,270,471 fully explains the function and operation of the transfer dog and the manner in which the transfer elements 379 are released thereby consequently such mechanism will not be described in further detail herein.

The tabular stop key 125 may be operated when it is desired to skip a field in the record card and move the card carriage directly to the next column in which a perforation is to be made. Depression of key 125 causes the rack 121 to become disengaged from the pinion 123 whereupon the carriage feeding spring drum moves the carriage to the next position in which a perforation is to be made, such position being determined by means of suitable column stops 384 (Figure 6) on a bar 385 mounted in the carriage 98. This mechanism is substantially similar to the mechanism shown and described in Patent No. 1,867,025 to which reference may be had for a detailed description.

The machine may be equipped with automatic column skipping mechanism also controlled by stops similar to the stops 384 or by the same stops. This mechanism is described in Patent No. 1,867,025 and need not be described herein as it is not essential to the proper functioning of the card carriage but an added feature covered by the aforesaid application.

*Preparing summary cards*

When the operator of the machine has finished preparing a group of cards having data relating to one or more classes, the accumulating mechanism may be cleared and a total or summary card prepared for each class total or group of totals accumulated. This is accomplished very readily by setting the lever 335 to "subtract", moving the carriage to bring the master wheel 314 into mesh with the gear 312 associated with the highest denominational order of the accumulator showing an accumulation and then operating the keys 210 according to the value of the digits representing the total, beginning with the digit in the highest denominational order. As a consequence of the foregoing operations the total standing on each accumulator will be cleared and simultaneously therewith punched and printed in the appropriate field on the summary card or cards.

Such summary cards may be gathered together as fast as they are prepared and preliminary reports prepared very quickly or a final report may be prepared directly from such cards thereby effecting a saving in the operating time of the tabulating machine and its operator and the wear incidental to the tabulating of large numbers of item cards.

It will be seen that the invention is of decided advantage to either a small organization, having only a few tabulating machines, or a large organization, having a large number of tabulating machines. It benefits the small organization mainly because of the reduced number of tabulating machines required while the large organization is further benefited by the greater speed with which preliminary reports may be had and the reduced wear in the tabulating machines owing to the ability of the machine to prepare the summary cards.

The present invention has been illustrated and described as embodied in a specific manner to a particular form of machine, however, it is not limited in scope to the precise constructions and arrangements shown as it may be modified as to form, arrangement, and details in order to utilize it to best advantage in its practical applications.

I claim—

1. In combination, accumulating mechanism, mechanism for entering amounts in said accumulating mechanism one digit at a time, perforating mechanism operable to perforate the index-point value of a digit in a record medium as said digit is entered in the accumulating mechanism, and means controlled by the amount entering mechanism for preventing complete restoration of the perforating mechanism before said digit has been entered in the accumulating mechanism.

2. In combination, accumulating mechanism, amount entering mechanism operable to enter amounts in the accumulating mechanism digit-by-digit, power driven perforating mechanism cooperating with the amount entering mechanism and adapted to perforate a record medium in an index-point position commensurate in value to a digit entered in the accumulating mechanism, and means controlled by the amount entering mechanism for preventing complete restoration of the perforating mechanism until the amount entering mechanism has completed entering a digit in the accumulating mechanism.

3. The invention set forth in claim 1 in which manipulative means is provided for rendering the preventing means ineffective in non-computing operations.

4. The invention set forth in claim 2 in which key-controlled means is provided to disable the preventing means in non-computing operations.

5. In combination, accumulating mechanism, a series of punches for punching digits in a record card including operating members therefor, means controlled by certain of said punch operating members for entering digits in the accumulating mechanism as the digits are punched, means controlled by the punch operating members for locking the punch operating members against complete operation during a part of their operating cycle and said locking means being releasable by the digit entering mechanism, and means controlled by another of said operating members for disabling the locking means.

6. In combination, accumulating mechanism, means for entering amounts in said accumulating mechanism, perforating mechanism operable to perforate a record medium in accordance with the value of an amount entered in the accumulating mechanism, means for preventing complete operation of the perforating mechanism until an amount has been fully entered in the accumulating mechanism; manipulative devices for controlling the perforating mechanism, certain of said devices also controlling the first named means, others of said devices controlling the perforating mechanism only; and means controlled by those devices which do not control the accumulating mechanism for disabling the preventing means.

7. In combination, accumulating mechanism, amount entering mechanism for entering amounts in the accumulating mechanism and operating in cycles, power driven perforating mechanism adapted to perforate a record medium according to each amount entered in the accumulating mechanism by the amount entering mechanism, said perforating mechanism likewise operating in cycles, means for initiating cycles of operation of both the amount entering mechanism and the perforating mechanism, and means controlled by the amount entering mechanism for preventing the perforating mechanism from completing its cycle of operation before the amount entering mechanism has completed a cycle of operation.

8. In combination, accumulating mechanism, amount entering mechanism for entering amounts in the accumulating mechanism and operating in cycles, power driven perforating mechanism adapted to perforate a record medium according to each amount entered in the accumulating mechanism by the amount entering mechanism, said perforating mechanism likewise operating in cycles, and means controlled by the amount entering mechanism for preventing the perforating mechanism from completing its cycle of operation before the amount entering mechanism has completed a cycle of operation.

9. In combination, perforating mechanism, including a series of punches, operating means therefor, and manipulative devices for selectively controlling operation of the punches by the operating means; accumulating mechanism; means controlled by the operating means of predetermined punches for entering amounts in the accumulating mechanism; means controlled by the operating means of the predetermined punches for locking the punches against operation during a part of the operating cycles of said punches, said locking means being releasable by the amount entering mechanism; and means controlled by any of the remaining punch operating means for disabling the locking means.

JOHN ROYDEN PEIRCE.